US012677289B2

(12) United States Patent
Yuan et al.

(10) Patent No.: US 12,677,289 B2
(45) Date of Patent: Jul. 7, 2026

(54) FREQUENCY SELECTIVE PRECODER INDICATION IN WIRELESS COMMUNICATIONS

(71) Applicant: QUALCOMM INCORPORATED, San Diego, CA (US)

(72) Inventors: Fang Yuan, Beijing (CN); Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 336 days.

(21) Appl. No.: 18/550,278

(22) PCT Filed: Apr. 30, 2021

(86) PCT No.: PCT/CN2021/091374
§ 371 (c)(1),
(2) Date: Sep. 12, 2023

(87) PCT Pub. No.: WO2022/226972
PCT Pub. Date: Nov. 3, 2022

(65) Prior Publication Data
US 2024/0155634 A1      May 9, 2024

(51) Int. Cl.
*H04W 72/23* (2023.01)
*H04B 7/0456* (2017.01)
*H04L 5/00* (2006.01)

(52) U.S. Cl.
CPC .......... *H04W 72/23* (2023.01); *H04B 7/0456* (2013.01); *H04L 5/0026* (2013.01); *H04L 5/0051* (2013.01); *H04L 5/0053* (2013.01)

(58) Field of Classification Search
CPC .... H04W 72/23; H04L 5/0026; H04L 5/0051; H04L 5/0053; H04B 7/0456; H04B 7/066; H04B 7/0404; H04B 7/0639
See application file for complete search history.

(56) References Cited

U.S. PATENT DOCUMENTS

2018/0146480 A1* 5/2018 Chendamarai Kannan ................
H04W 72/1268
2019/0104477 A1* 4/2019 MolavianJazi ....... H04L 5/0023
(Continued)

FOREIGN PATENT DOCUMENTS

CN          108668368 A      10/2018
CN          109150471 A       1/2019
(Continued)

OTHER PUBLICATIONS

International Search Report and Written Opinion—PCT/CN2021/091374—ISA/EPO—Jan. 27, 2022.
(Continued)

*Primary Examiner* — Shah M Rahman
(74) *Attorney, Agent, or Firm* — QUALCOMM Incorporated

(57)          ABSTRACT

Methods, systems, and devices for wireless communications are described in which frequency selective precoding may be used for wireless transmissions. A transmitting device, such as a user equipment (UE), may have a set of allocated resources that include time domain resources and frequency domain resources, and different precoding may be applied to different portions of the frequency domain resources. The different precoding may be indicated in a resource grant that indicates multiple precoders that that are associated with different portions of frequency domain resources, such as different precoders that are associated with different reference signal resources sets that are associated with portions of the frequency domain resources. The indication of multiple precoders may be provided with an uplink grant to a UE that is associated with a single antenna panel at the UE.

30 Claims, 17 Drawing Sheets

(56)     References Cited

U.S. PATENT DOCUMENTS

| | | | | |
|---|---|---|---|---|
| 2019/0281588 | A1 | 9/2019 | Zhang et al. | |
| 2019/0357151 | A1 | 11/2019 | Zhang et al. | |
| 2020/0119783 | A1 | 4/2020 | Liu et al. | |
| 2020/0196388 | A1 | 6/2020 | Zhang et al. | |
| 2020/0336998 | A1* | 10/2020 | Rahman | H04W 8/24 |
| 2020/0366344 | A1* | 11/2020 | Davydov | H04L 5/0007 |
| 2021/0143879 | A1* | 5/2021 | Ji | H04B 7/0626 |
| 2021/0167821 | A1* | 6/2021 | Chen | H04B 7/0617 |
| 2021/0168714 | A1* | 6/2021 | Guan | H04W 52/16 |
| 2021/0297134 | A1* | 9/2021 | Rahman | H04B 7/0639 |
| 2021/0337568 | A1* | 10/2021 | Xu | H04W 72/0453 |
| 2022/0278728 | A1* | 9/2022 | Vankayala | H04B 7/0639 |
| 2022/0337373 | A1* | 10/2022 | Wu | H04L 5/0048 |
| 2023/0217429 | A1* | 7/2023 | Faxér | H04L 5/0051 |
| | | | | 370/329 |

FOREIGN PATENT DOCUMENTS

| | | | | | |
|---|---|---|---|---|---|
| EP | 4290796 | A2 * | 12/2023 | | H04L 5/0051 |
| WO | WO-2019047972 | A1 * | 3/2019 | | H04B 7/0628 |
| WO | WO-2020223834 | | 11/2020 | | |

OTHER PUBLICATIONS

Nokia: "Introduction of NR Enhanced MIMO", 3GPP Draft, 3GPP TSG-RAN WG1 Meeting #99, R1-1913203, Reno, USA, Nov. 18-22, 2019, 47 Pages.
Supplementary European Search Report—EP21938447—Search Authority—Munich—Dec. 11, 2024.

* cited by examiner

1st Precoding
(1st Freq.
Resources)
235

2nd Precoding
(2nd Freq.
Resources)
240

225

230   210

220   205   215

115-a 105-a 110-a

215   Configuration Information

220   Control Information

225   SRS Transmissions

230   Uplink Transmission

200

105-b 115-b

505   RS Resource Set Configuration

SRS1

510   SRS2

515

520   Determine UL Precoders For Different SRI/TPMI

525   Resource Allocation DCI

Determine Precoders For Different Frequencies   530

UL Transmission – 1st frequency resources

535   UL Transmission – 2nd frequency resources

540

500

610

620

615

605

600

Figure 14:
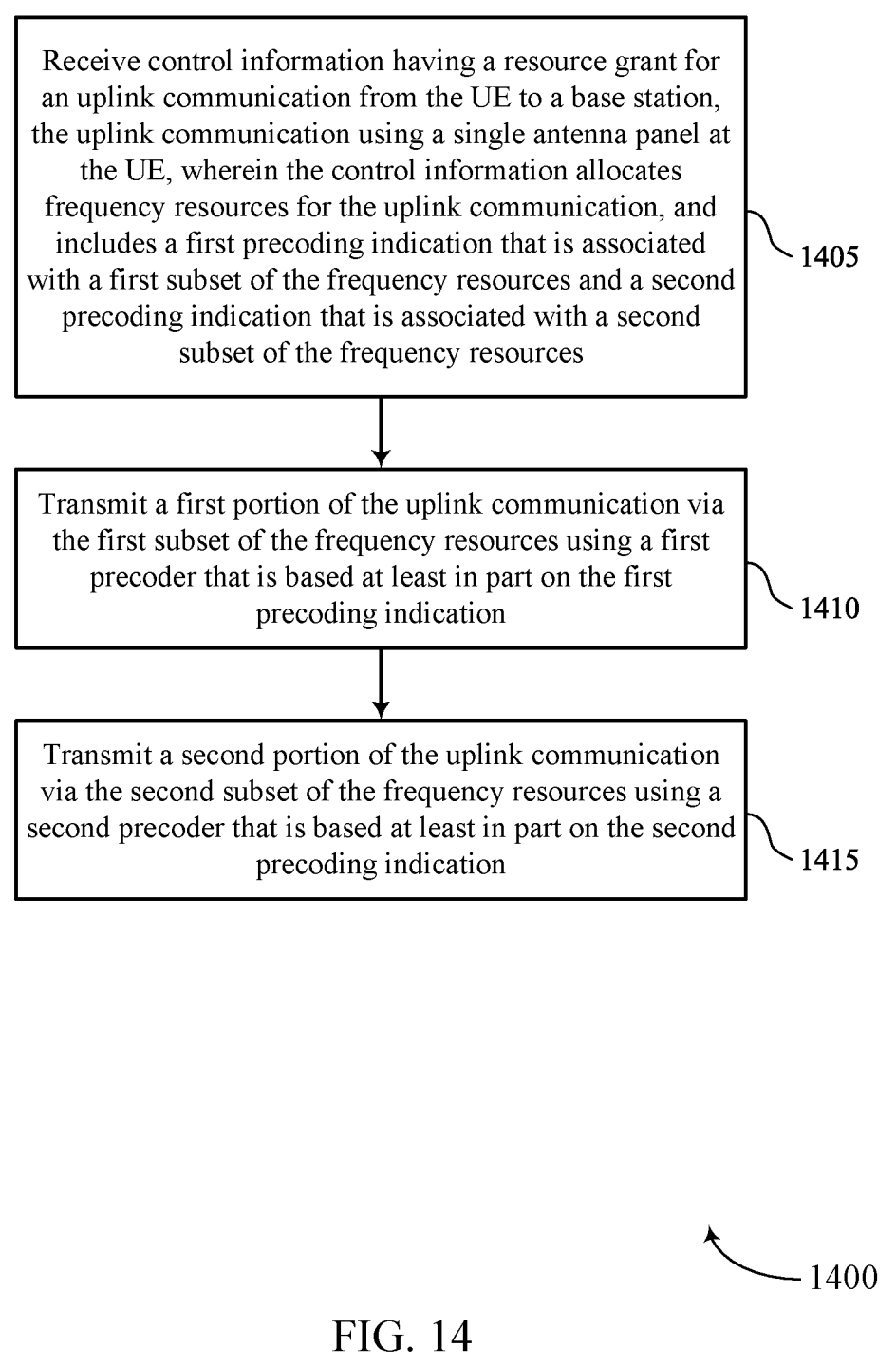

Receive control information having a resource grant for an uplink communication from the UE to a base station, the uplink communication using a single antenna panel at the UE, wherein the control information allocates frequency resources for the uplink communication, and includes a first precoding indication that is associated with a first subset of the frequency resources and a second precoding indication that is associated with a second subset of the frequency resources

1405

Transmit a first portion of the uplink communication via the first subset of the frequency resources using a first precoder that is based at least in part on the first precoding indication

1410

Transmit a second portion of the uplink communication via the second subset of the frequency resources using a second precoder that is based at least in part on the second precoding indication

Figure 15:
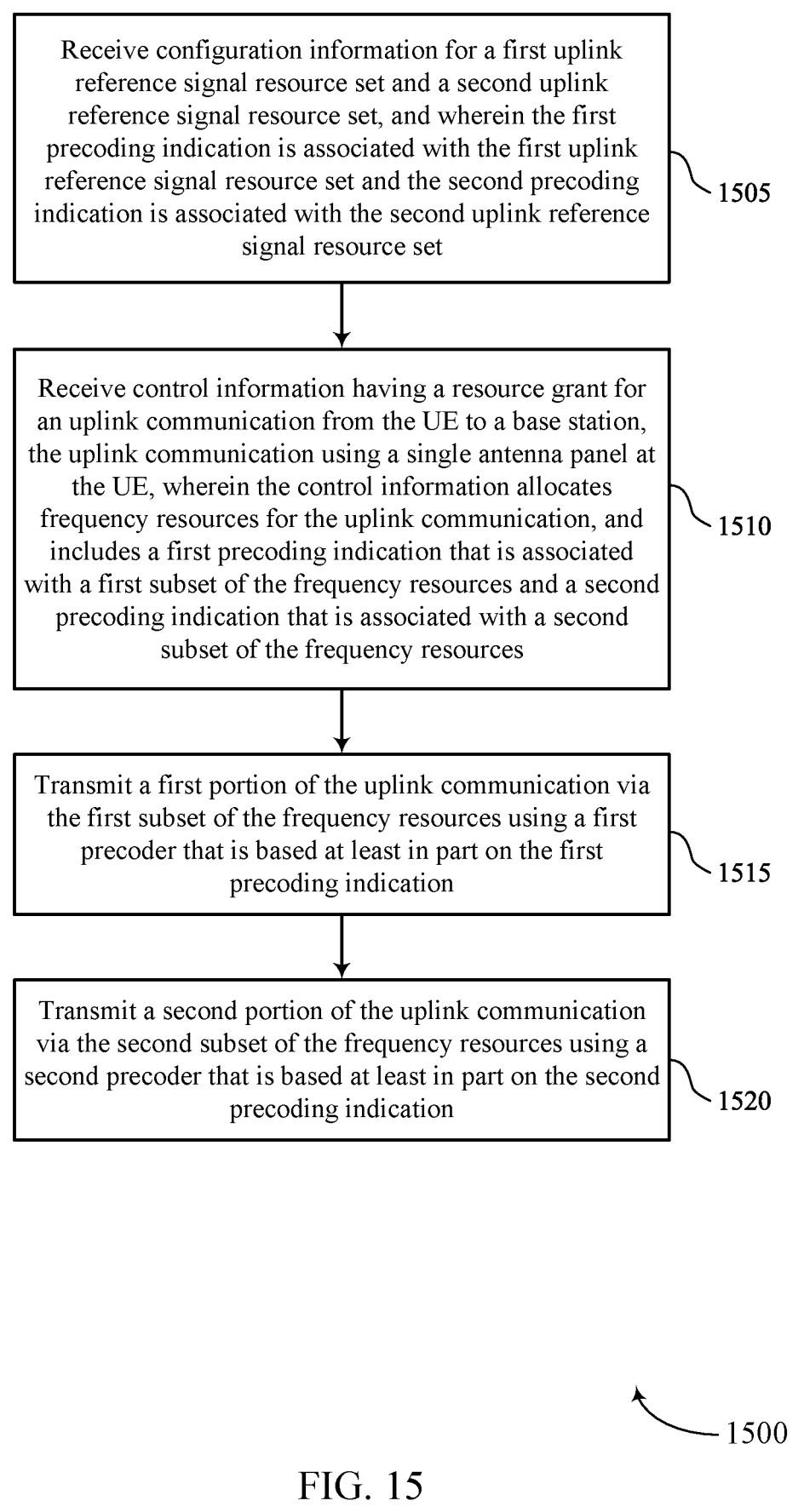

Receive configuration information for a first uplink reference signal resource set and a second uplink reference signal resource set, and wherein the first precoding indication is associated with the first uplink reference signal resource set and the second precoding indication is associated with the second uplink reference signal resource set

1505

Receive control information having a resource grant for an uplink communication from the UE to a base station, the uplink communication using a single antenna panel at the UE, wherein the control information allocates frequency resources for the uplink communication, and includes a first precoding indication that is associated with a first subset of the frequency resources and a second precoding indication that is associated with a second subset of the frequency resources

1510

Transmit a first portion of the uplink communication via the first subset of the frequency resources using a first precoder that is based at least in part on the first precoding indication

1515

Transmit a second portion of the uplink communication via the second subset of the frequency resources using a second precoder that is based at least in part on the second precoding indication

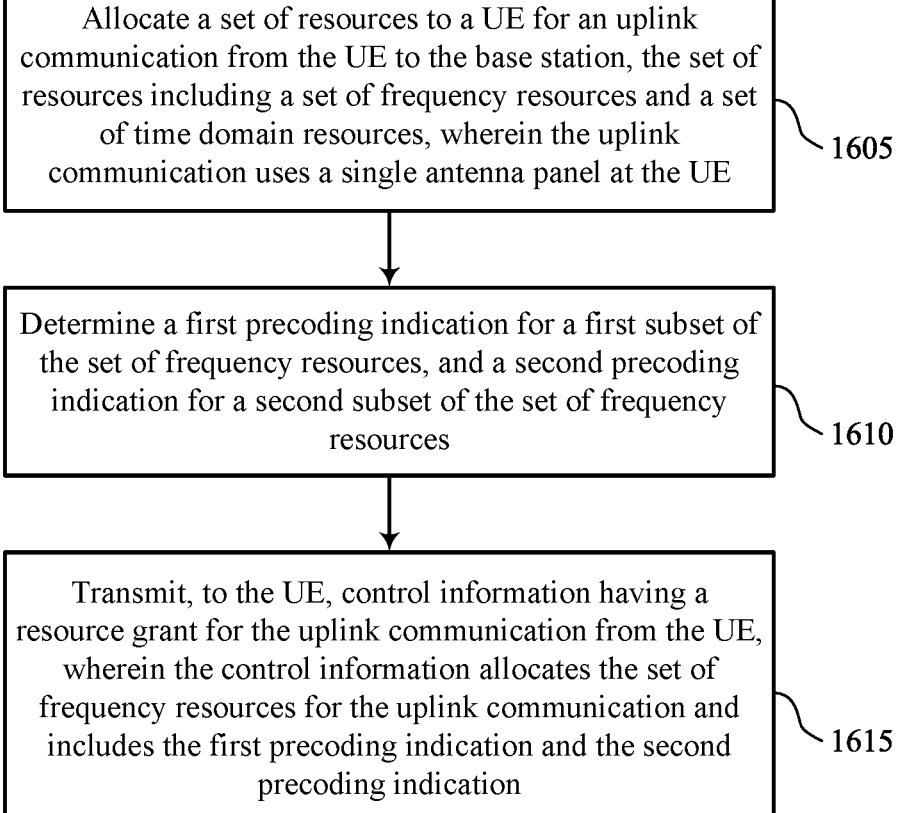

Allocate a set of resources to a UE for an uplink communication from the UE to the base station, the set of resources including a set of frequency resources and a set of time domain resources, wherein the uplink communication uses a single antenna panel at the UE ~ 1605

Determine a first precoding indication for a first subset of the set of frequency resources, and a second precoding indication for a second subset of the set of frequency resources ~ 1610

Transmit, to the UE, control information having a resource grant for the uplink communication from the UE, wherein the control information allocates the set of frequency resources for the uplink communication and includes the first precoding indication and the second precoding indication ~ 1615

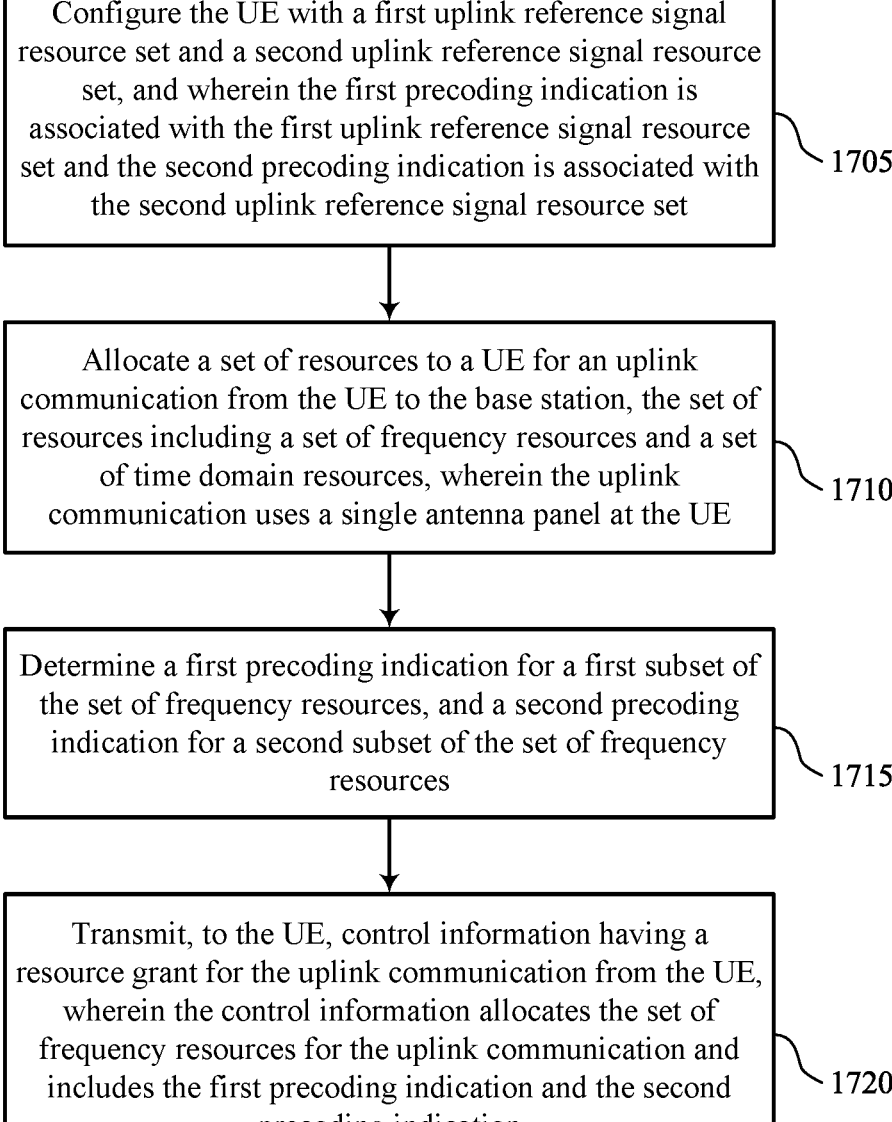

Configure the UE with a first uplink reference signal resource set and a second uplink reference signal resource set, and wherein the first precoding indication is associated with the first uplink reference signal resource set and the second precoding indication is associated with the second uplink reference signal resource set

1705

Allocate a set of resources to a UE for an uplink communication from the UE to the base station, the set of resources including a set of frequency resources and a set of time domain resources, wherein the uplink communication uses a single antenna panel at the UE

1710

Determine a first precoding indication for a first subset of the set of frequency resources, and a second precoding indication for a second subset of the set of frequency resources

1715

Transmit, to the UE, control information having a resource grant for the uplink communication from the UE, wherein the control information allocates the set of frequency resources for the uplink communication and includes the first precoding indication and the second precoding indication

FREQUENCY SELECTIVE PRECODER INDICATION IN WIRELESS COMMUNICATIONS

CROSS REFERENCE

The present application is a 371 national stage filing of International PCT Application No. PCT/CN2021/091374 by YUAN et al. entitled "FREQUENCY SELECTIVE PRE-CODER INDICATION IN WIRELESS COMMUNICA-TIONS," filed Apr. 30, 2021, which is assigned to the assignee hereof, and which is expressly incorporated by reference in its entirety herein.

FIELD OF TECHNOLOGY

The following relates to wireless communications, including frequency selective precoder indication in wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a transmitting device may precode signals to be transmitted to a receiving device. Precoding may refer to a technique used to weight multiple streams (e.g., data streams) from a transmitting device and may limit the effects of a channel on the signals received at a receiving device. Improved techniques for selecting suitable precoders for precoding transmissions in a wireless communications system may be desirable.

SUMMARY

The described techniques relate to improved methods, systems, devices, and apparatuses that support frequency selective precoder indication in wireless communications. In various aspects, the described techniques provide for configuration of multiple uplink reference signal resource sets that may be associated with different portions of one or more uplink frequency allocations for uplink communications from a user equipment (UE) to a base station. The base station may measure uplink reference signals (e.g., sounding reference signals (SRSs)) from the multiple reference signal resource sets, and determine a precoding associated with each reference signal resource set. The base station may provide an uplink grant to the UE that indicates multiple precoders that that are associated with different portions of an uplink frequency allocation that are associated with different uplink reference signal resources sets. In some cases, the indication of multiple precoders may be provided with an uplink grant that is associated with a single antenna panel at the UE (e.g., as indicated by a single transmit power control (TPC) command, a single set of power control parameters, a single transmission configuration indication (TCI) state, or combinations thereof, associated with the uplink grant).

A method for wireless communication at a user equipment (UE) is described. The method may include receiving control information having a resource grant for an uplink communication from the UE to a base station, the uplink communication using a single antenna panel at the UE, where the control information allocates frequency resources for the uplink communication, and includes a first precoding indication that is associated with a first subset of the frequency resources and a second precoding indication that is associated with a second subset of the frequency resources, transmitting a first portion of the uplink communication via the first subset of the frequency resources using a first precoder that is based on the first precoding indication, and transmitting a second portion of the uplink communication via the second subset of the frequency resources using a second precoder that is based on the second precoding indication.

An apparatus for wireless communication at a UE is described. The apparatus may include a processor, memory coupled with the processor, and instructions stored in the memory. The instructions may be executable by the processor to cause the apparatus to receive control information having a resource grant for an uplink communication from the UE to a base station, the uplink communication using a single antenna panel at the UE, where the control information allocates frequency resources for the uplink communication, and includes a first precoding indication that is associated with a first subset of the frequency resources and a second precoding indication that is associated with a second subset of the frequency resources, transmit a first portion of the uplink communication via the first subset of the frequency resources using a first precoder that is based on the first precoding indication, and transmit a second portion of the uplink communication via the second subset of the frequency resources using a second precoder that is based on the second precoding indication.

Another apparatus for wireless communication at a UE is described. The apparatus may include means for receiving control information having a resource grant for an uplink communication from the UE to a base station, the uplink communication using a single antenna panel at the UE, where the control information allocates frequency resources for the uplink communication, and includes a first precoding indication that is associated with a first subset of the frequency resources and a second precoding indication that is associated with a second subset of the frequency resources, means for transmitting a first portion of the uplink communication via the first subset of the frequency resources using a first precoder that is based on the first precoding indication, and means for transmitting a second portion of the uplink communication via the second subset of the frequency resources using a second precoder that is based on the second precoding indication.

A non-transitory computer-readable medium storing code for wireless communication at a UE is described. The code may include instructions executable by a processor to receive control information having a resource grant for an uplink communication from the UE to a base station, the uplink communication using a single antenna panel at the UE, where the control information allocates frequency resources for the uplink communication, and includes a first precoding indication that is associated with a first subset of the frequency resources and a second precoding indication that is associated with a second subset of the frequency resources, transmit a first portion of the uplink communication via the first subset of the frequency resources using a first precoder that is based on the first precoding indication, and transmit a second portion of the uplink communication via the second subset of the frequency resources using a second precoder that is based on the second precoding indication.

Some examples of the method, apparatuses, and non-transitory computer-readable medium described herein may further include operations, features, means, or instructions for receiving configuration information for a first uplink reference signal resource set and a second uplink reference signal resource set, and where the first precoding indication is associated with the first uplink reference signal resource set and the second precoding indication is associated with the second uplink reference signal resource set. In some examples of the method, apparatuses, and non-transitory computer-readable medium described herein, the first uplink reference signal resource set is identified by a first sounding reference signal (SRS) resource indicator (SRI) that is provided in the control information and is associated with the first precoding indication, and the second uplink reference signal resource set is identified by a second SRI that is provided in the control information and is associated with the second precoding indication. In some examples of the method, apparatuses, and non-transitory computer-readable medium described herein, the first uplink reference signal resource set and the second uplink reference signal resource set are each configured for codebook-based or non-codebook-based multiple input multiple output (MIMO) communications.

In some examples of the method, apparatuses, and non-transitory computer-readable medium described herein, the control information includes a single transmit power command for the uplink communication from the UE to the base station. In some examples of the method, apparatuses, and non-transitory computer-readable medium described herein, the control information includes a single set of power control parameters for the uplink communication from the UE to the base station. In some examples of the method, apparatuses, and non-transitory computer-readable medium described herein, the single set of power control parameters includes one or more of a path loss reference signal, a fractional power control parameter, a nominal transmit power, an index value associated with a power control procedure, or any combinations thereof. In some examples of the method, apparatuses, and non-transitory computer-readable medium described herein, the control information includes a single transmission configuration indication (TCI), and both of the first precoding indication and the second precoding indication, for the uplink communication from the UE to the base station.

In some examples of the method, apparatuses, and non-transitory computer-readable medium described herein, the first subset of the frequency resources is associated with a first frequency hop for the uplink communication, and the second subset of the frequency resources is associated with a second frequency hop for the uplink communication. In some examples of the method, apparatuses, and non-transitory computer-readable medium described herein, the first frequency hop and the second frequency hop is intra-slot frequency hops or inter-slot frequency hops. In some examples of the method, apparatuses, and non-transitory computer-readable medium described herein, the control information includes one or more of a first frequency allocation indication associated with the first frequency hop, a second frequency allocation indication associated with the second frequency hop, a time domain offset value for the second frequency hop, or any combinations thereof.

In some examples of the method, apparatuses, and non-transitory computer-readable medium described herein, the frequency resources for the uplink communication span a contiguous set of frequency resources in a same time domain resource. In some examples of the method, apparatuses, and non-transitory computer-readable medium described herein, the first subset of the frequency resources and the second subset of the frequency resources occupy different contiguous portions of the contiguous set of frequency resources. In some examples of the method, apparatuses, and non-transitory computer-readable medium described herein, the first subset of the frequency resources is interleaved with the second subset of the frequency resources within the contiguous set of frequency resources.

A method for wireless communication at a base station is described. The method may include allocating a set of resources to a UE for an uplink communication from the UE to the base station, the set of resources including a set of frequency resources and a set of time domain resources, where the uplink communication uses a single antenna panel at the UE, determining a first precoding indication for a first subset of the set of frequency resources, and a second precoding indication for a second subset of the set of frequency resources, and transmitting, to the UE, control information having a resource grant for the uplink communication from the UE, where the control information allocates the set of frequency resources for the uplink communication and includes the first precoding indication and the second precoding indication.

An apparatus for wireless communication at a base station is described. The apparatus may include a processor, memory coupled with the processor, and instructions stored in the memory. The instructions may be executable by the processor to cause the apparatus to allocate a set of resources to a UE for an uplink communication from the UE to the base station, the set of resources including a set of frequency resources and a set of time domain resources, where the uplink communication uses a single antenna panel at the UE, determine a first precoding indication for a first subset of the set of frequency resources, and a second precoding indication for a second subset of the set of frequency resources, and transmit, to the UE, control information having a resource grant for the uplink communication from the UE, where the control information allocates the set of frequency resources for the uplink communication and includes the first precoding indication and the second precoding indication.

Another apparatus for wireless communication at a base station is described. The apparatus may include means for allocating a set of resources to a UE for an uplink communication from the UE to the base station, the set of resources including a set of frequency resources and a set of time domain resources, where the uplink communication uses a single antenna panel at the UE, means for determining a first precoding indication for a first subset of the set of frequency resources, and a second precoding indication for a second subset of the set of frequency resources, and means for transmitting, to the UE, control information having a resource grant for the uplink communication from the UE, where the control information allocates the set of frequency resources for the uplink communication and includes the first precoding indication and the second precoding indication.

A non-transitory computer-readable medium storing code for wireless communication at a base station is described. The code may include instructions executable by a processor to allocate a set of resources to a UE for an uplink communication from the UE to the base station, the set of resources including a set of frequency resources and a set of time domain resources, where the uplink communication uses a single antenna panel at the UE, determine a first precoding indication for a first subset of the set of frequency resources, and a second precoding indication for a second subset of the set of frequency resources, and transmit, to the UE, control information having a resource grant for the uplink communication from the UE, where the control information allocates the set of frequency resources for the uplink communication and includes the first precoding indication and the second precoding indication.

Some examples of the method, apparatuses, and non-transitory computer-readable medium described herein may further include operations, features, means, or instructions for configuring the UE with a first uplink reference signal resource set and a second uplink reference signal resource set, and where the first precoding indication is associated with the first uplink reference signal resource set and the second precoding indication is associated with the second uplink reference signal resource set. In some examples of the method, apparatuses, and non-transitory computer-readable medium described herein, the first uplink reference signal resource set is identified by a first SRS resource indicator (SRI) that is provided in the control information and is associated with the first precoding indication, and the second uplink reference signal resource set is identified by a second SRI that is provided in the control information and is associated with the second precoding indication. In some examples of the method, apparatuses, and non-transitory computer-readable medium described herein, the first uplink reference signal resource set and the second uplink reference signal resource set are each configured for codebook-based or non-codebook-based multiple input multiple output (MIMO) communications.

In some examples of the method, apparatuses, and non-transitory computer-readable medium described herein, the control information includes a single transmit power command for the uplink communication from the UE to the base station. In some examples of the method, apparatuses, and non-transitory computer-readable medium described herein, the control information includes a single set of power control parameters for the uplink communication from the UE to the base station. In some examples of the method, apparatuses, and non-transitory computer-readable medium described herein, the single set of power control parameters includes one or more of a path loss reference signal, a fractional power control parameter, a nominal transmit power, an index value associated with a power control procedure, or any combinations thereof. In some examples of the method, apparatuses, and non-transitory computer-readable medium described herein, the control information includes a single transmission configuration indication (TCI), and both of the first precoding indication and the second precoding indication, for the uplink communication from the UE to the base station.

In some examples of the method, apparatuses, and non-transitory computer-readable medium described herein, the first subset of the set of frequency resources is associated with a first frequency hop for the uplink communication, and the second subset of the set of frequency resources is associated with a second frequency hop for the uplink communication. In some examples of the method, apparatuses, and non-transitory computer-readable medium described herein, the first frequency hop and the second frequency hop is intra-slot frequency hops or inter-slot frequency hops. In some examples of the method, apparatuses, and non-transitory computer-readable medium described herein, the control information includes one or more of a first frequency allocation indication associated with the first frequency hop, a second frequency allocation indication associated with the second frequency hop, a time domain offset value for the second frequency hop, or any combinations thereof.

In some examples of the method, apparatuses, and non-transitory computer-readable medium described herein, the set of frequency resources for the uplink communication span contiguous frequency resources in a same time domain resource. In some examples of the method, apparatuses, and non-transitory computer-readable medium described herein, the first subset of the set of frequency resources and the second subset of the set of frequency resources occupy different contiguous portions of the set of frequency resources. In some examples of the method, apparatuses, and non-transitory computer-readable medium described herein, the first subset of the set of frequency resources is interleaved with the second subset of the set of frequency resources.

BRIEF DESCRIPTION OF THE DRAWINGS

FIGS. 14 through 17 show flowcharts illustrating methods that support frequency selective precoder indication in wireless communications in accordance with aspects of the present disclosure.

DETAILED DESCRIPTION

Figure 1:
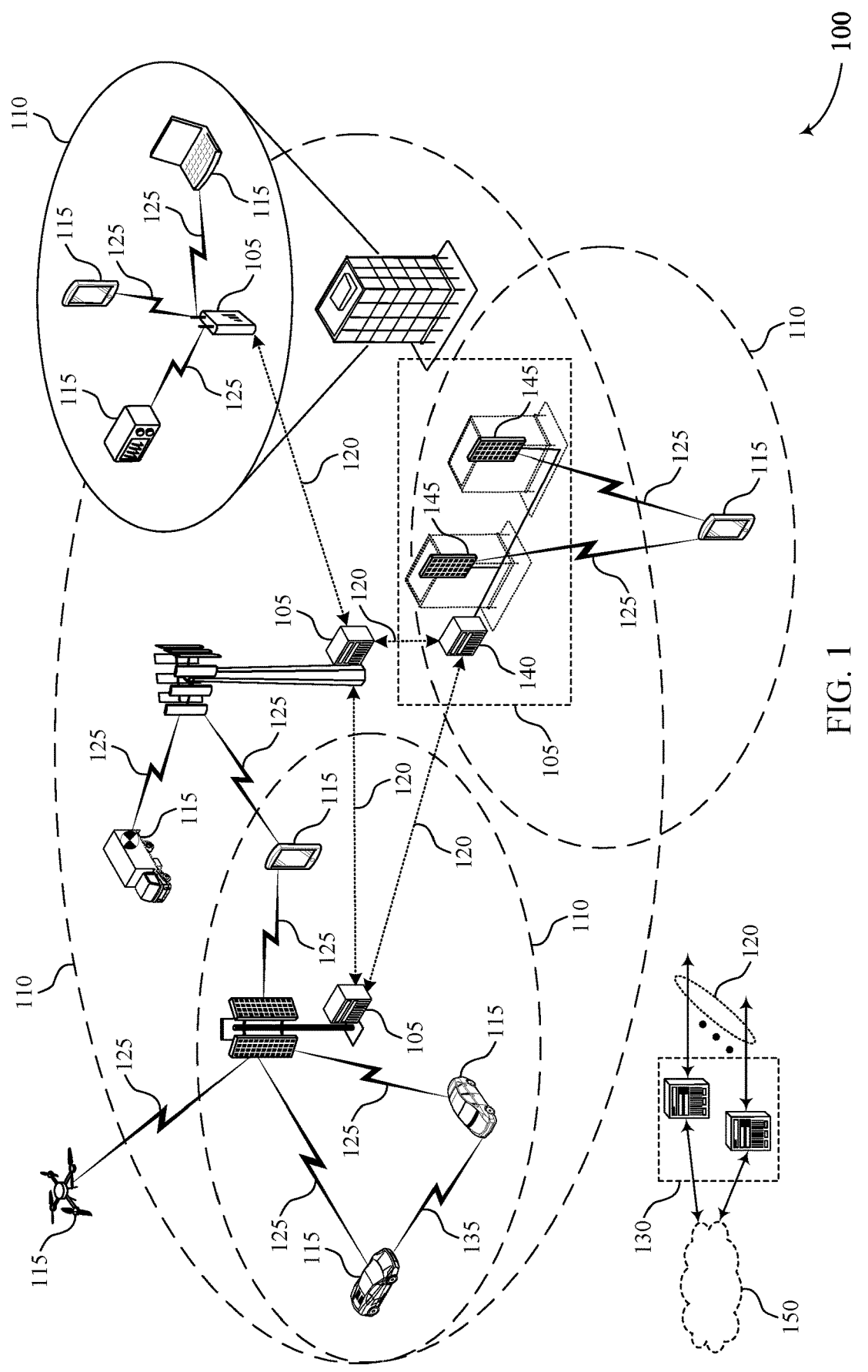
FIG. 1 illustrates an example of a wireless communications system that supports frequency selective precoder indication in wireless communications in accordance with aspects of the present disclosure.

Wireless systems may support access links that may be configured to support precoding to help compensate for channel conditions and enhance the likelihood of successful communications between a transmitting device (e.g., a user equipment (UE) or base station) and a receiving device (e.g., a UE or base station). Efficient and effective precoding may be important to the performance for different types of communication operations, such as multiple-in-multiple-out (MIMO) performance. Precoding that is applied at a transmitting device may be determined based on one or more measurements of one or more reference signals, that may be used to estimate a channel and determine precoding that may enhance communications on the estimated channel. The channel estimation may be obtained using various techniques. For example, a user equipment (UE) may transmit a sounding reference signal (SRS) to the base station, and the base station may estimate the channel based on measuring the SRS. The measurements may be used to determine a precoding that the UE should apply to uplink communications.

In some cases, multiple SRS resource sets may be configured at a UE, and SRSs transmitted using the multiple SRS resource sets may be measured and used to determine multiple different precoders for the UE. In some cases, different precoders may be applied to an uplink MIMO transmission (e.g., a physical uplink shared channel (PUSCH) transmission). In accordance with various techniques discussed herein, a base station may provide an uplink grant to a UE (e.g., in a downlink control information (DCI) transmission) that indicates frequency selective precoding for a single-panel uplink transmission from the UE. Frequency selective precoding, in some cases, may enhance uplink performance by providing precoding based on channel conditions associated with different frequencies of an uplink resource allocation. In some use cases, such as for customer premises equipment (CPE), frequency selective fading or interference may be present within a facility due to facility layout, equipment that may generate interference, and the like. In such cases, frequency selective precoding for a single panel uplink transmission may substantially enhance the likelihood of successful reception of an uplink communication, and thereby enhance network capacity, latency, and reliability.

In some cases, a base station may provide for configuration of multiple uplink reference signal resource sets (e.g., SRS resources sets) that may be associated with different portions of one or more uplink frequency allocations for uplink communications from the UE to the base station. The base station may measure uplink reference signals (e.g., SRSs) from the multiple reference signal resource sets, and determine a precoding associated with each reference signal resource set. The base station may provide an uplink grant to the UE that indicates multiple precoders that that are associated with different portions of an uplink frequency allocation. For example, an uplink grant may include multiple precoder indicators (e.g., multiple SRS resource indicator (SRI) fields or multiple transmitted precoder matrix indicator (TPMI) fields) that are applied to different portions of a PUSCH frequency allocation, where each precoder indicator may be associated with a different uplink reference signal resource set. In some cases, the indication of multiple precoders may be provided with an uplink grant that is associated with a single antenna panel at the UE. In some cases, the association with a single antenna panel may be indicated by a single transmit power control (TPC) command, a single set of power control parameters, a single transmission configuration indication (TCI) state, or combinations thereof, associated with the uplink grant.

Aspects of the subject matter described in this disclosure may be implemented to realize one or more technical improvements, among other advantages. The described techniques employed by wireless devices may provide benefits and enhancements to wireless communications carried out between UEs and base stations, which may include increased reliability for wireless communications. For instance, the techniques described herein may increase reliability in MIMO communications, resulting in more efficient and reliable wireless communications, thereby increasing data rates and link capacity.

Aspects of the disclosure are initially described in the context of wireless communications systems. Aspects of the disclosure are additionally described in the context of resource associations and a process flow. Aspects of the disclosure are further illustrated by and described with reference to apparatus diagrams, system diagrams, and flowcharts that relate to frequency selective precoder indication in wireless communications.

FIG. 1 illustrates an example of a wireless communications system 100 that supports frequency selective precoder indication in wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, a base station 105 may configure a UE 115 with multiple uplink reference signal resource sets that may be associated with different portions of one or more uplink frequency allocations for uplink communications from the UE 115 to the base station 105. The base station 105 may measure uplink reference signals (e.g., SRSs) from the multiple reference signal resource sets, and determine a precoding associated with each reference signal resource set. The base station 105 may provide an uplink grant to the UE 115 that indicates multiple precoders that that are associated with different portions of an uplink frequency allocation that are associated with different uplink reference signal resources sets. In some cases, the indication of multiple precoders may be provided with an uplink grant that is associated with a single antenna panel at the UE 115.

Figure 2:
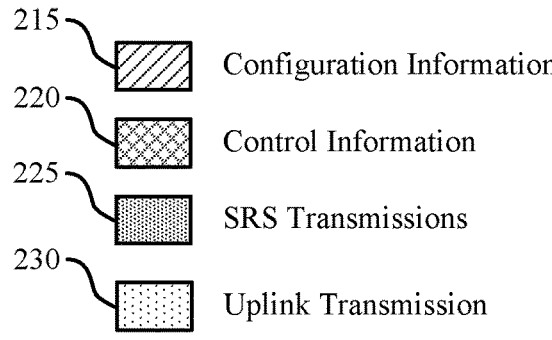
FIG. 2 illustrates an example of a portion of a wireless communications system that supports frequency selective precoder indication in wireless communications in accordance with aspects of the present disclosure.

FIG. 2 illustrates an example of a wireless communications system 200 that supports frequency selective precoder indication in wireless communications in accordance with aspects of the present disclosure. In some examples, the wireless communications system 200 may implement aspects of the wireless communications system 100. For example, the wireless communications system 200 may include a base station 105-a and a UE 115-a, which may be examples of a base station 105 and a UE 115 as described with reference to FIG. 1. In some cases, the UE 115-a may use different precoders for different portions of a frequency domain resource allocation for uplink transmissions to the base station 105-a.

In this example, the base station 105-a and the UE 115-a may communicate using a downlink channel 205 and an uplink channel 210. For example, the UE 115-a may receive downlink messages including configuration information 215 and control information 220 from the base station 105-a via the downlink channel 205, and may transmit uplink reference signals 225 and uplink transmissions 230 (e.g., PUSCH transmissions) to the base station 105-a via the uplink channel 210. Additionally, the UE 115-a and the base station 105-a may support precoded MIMO communications to enhance data throughput and reliability. For example, the UE 115-a may transmit uplink transmissions 230 to the base station 105-a via the uplink channel 210 using frequency selective precoding. In this example, the base station 105-a may configure multiple reference signal resource sets (e.g., multiple SRS resource sets) in the configuration information 215. The multiple SRS resource sets may be configured for the same usage, for example, for codebook based MIMO transmission scheme, or for non-codebook based MIMO scheme. In some examples, for non-codebook based MIMO scheme, all SRS resources in the multiple SRS resource set may be configured with the same beam (i.e., the same spatial transmit filter, spatial ration information, or TCI state). The UE 115-a may transmit multiple uplink reference signals 225 to the base station 105-a using the configured uplink reference signal resource sets. The base station 105-a may measure the uplink reference signal 225 transmissions and determine associated precoding for the associated reference signal resources. In some cases, the control information 220 may include an uplink grant for uplink transmission 230, that may indicate allocated uplink resources. The allocated uplink resources may include time domain resources and frequency domain resources. In accordance with aspects described herein, the allocated frequency domain resources may include a first portion of frequency resources that have a first precoding indicator and a second portion of frequency resources that have a second precoding indicator. The UE 115-*a*, based on the control information 220, may transmit the uplink transmission 230 using frequency selective precoding in which a first precoding 235 is used for the first portion of the allocated frequency resources and a second precoding 240 is used for the second portion of the allocated frequency resources.

The wireless communications system 200 may use codebook-based precoding or non-codebook-based precoding. To communicate according to a codebook-based transmission scheme, the UE 115-*a* may transmit one or more non-precoded (e.g., un-precoded) uplink reference signals 225 (e.g., SRSs) to the base station 105-*a* using an associated reference signal resource of a reference signal resource set. In some examples, the UE 115-*a* may be configured to transmit SRSs aperiodically and an SRS request field in a DCI message transmitted by the base station 105-*a* may trigger transmission of the non-precoded SRSs. The base station 105-*a* may receive the one or more SRSs and may select a precoder for uplink communications based on measured channel conditions or channel quality of the received one or more SRS transmissions (e.g., based on a signal-to-interference-plus-noise ratio (SINR) indicated by the SRS). The different SRS resources may be associated with different portions of a potential frequency domain resource allocation to the UE 115-*a*, and the base station 105-*a* may indicate the selected precoder via a codebook indicator. For example, the codebook indicator may include an SRS resource indicator (SRI) to indicate the selected precoder, a number of spatial layers or rank of a corresponding uplink message, a transmitted precoding matrix indicator (TPMI), or a combination thereof. The UE 115-*a* may use the TPMI and/or SRI to determine associated precoding. In some examples, the base station 105-*a* may transmit the codebook indicators in control information 220 (e.g., in a DCI message including an uplink grant and multiple precoding indicators). In other cases, precoding indicators may be provided in or configured by other signaling, such as in an RRC message, a MAC-control element (MAC-CE) message, or a combination thereof.

Wireless communications system 200 may also support non-codebook-based MIMO communications. For non-codebook-based uplink communications, the UE 115-*a* may determine precoding candidates for uplink transmission 230, and the base station 105-*a* may select a subset of the SRS resources for the precoding for the uplink transmission 230. For example, the UE 115-*a* may perform a measurement of a downlink channel (e.g., a channel state information reference signal (CSI-RS) measurement) and determine several uplink precoding candidates. For each candidate, the UE 115-*a* may send an uplink reference signal 225 (e.g., SRS) to the base station 105-*a*, and the base station 105-*a* may measure the uplink reference signals 225 indicate a subset of the uplink reference signals 225 to the UE 115-*a* based on the measurements. That is, the base station 105-*a* indicates that the UE 115-*a* is to use the precoding associated with the selected reference signal resources for the uplink transmission 230.

To support non-codebook-based MIMO, the UE 115-*a* may be configured with an SRS resource set for non-codebook usage. In some examples, up to four SRS resources may be configured for the SRS resource set, where one port corresponds to each SRS resource. The UE 115-*a* may determine a mapping of an SRS port to the transmission antennas of a single antenna panel, and the mapping may be referred to as the SRS precoding. Each mapping may be considered as a candidate for the mapping of the uplink transmission 230 to the transmission antennas. As discussed herein, an uplink grant may include multiple SRIs that indicate the SRS resources, and thereby indicate the precoding for that portion of the allocated frequency resources.

In some cases, the configuration information 215 may configure the UE 115-*a* with two SRS resource sets of usage for non-codebook or codebook based MIMO. Further, in some cases, the configuration information 215 may configure the UE 115-*a* for frequency selective precoders for uplink transmissions 230, where two precoders are indicated in the same DCI that is provided in control information 220. In some cases, the first precoding 235 is indicated by a first precoding field (e.g., by a SRI/TPMI field1) that is applied to the first part of the frequency allocation of the uplink transmission 230. In some cases, the first precoder indication is associated with a first SRS resource set. The second precoding 240 may be indicated by a second precoding field (e.g., by a SRI/TPMI field2) that is applied to the second part of the frequency allocation of the uplink transmission 230. In some cases, the second precoder indication is associated with a second SRS resource set. Further, the DCI may indicate that the uplink transmission 230 is a single-panel transmission from the UE 115-*a*. For example, the uplink grant may indicate a single-panel transmission through having a single TPC in the DCI for the PUSCH, a single set of power control parameters in the DCI for the PUSCH (e.g., path loss reference signal, alpha, P0, closeloopindex, or combinations thereof), a single TCI state that is indicated to the PUSCH and the two SRS resource sets, or any combinations thereof.

Figure 3:
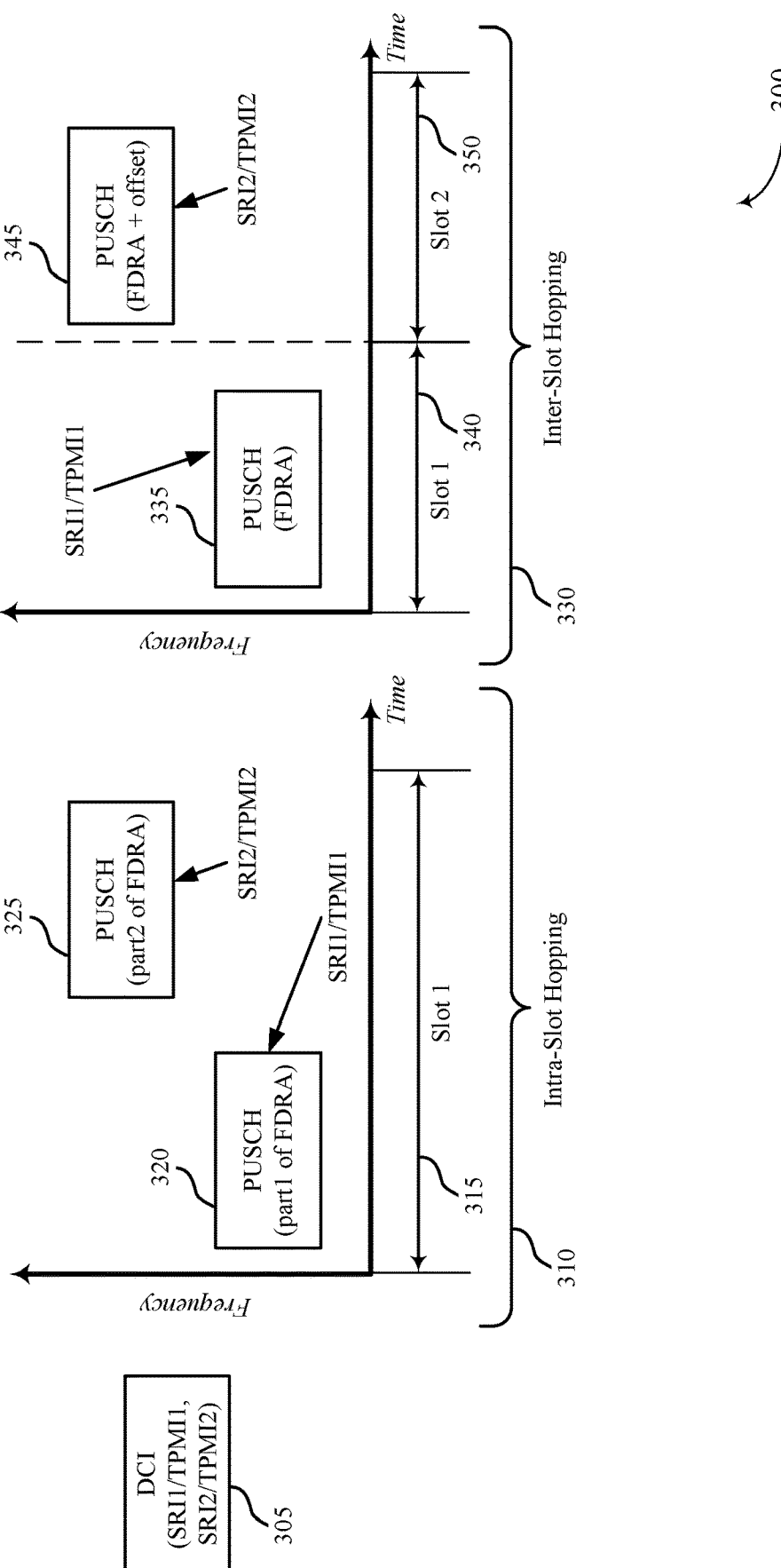
FIGS. 3 and 4 illustrate examples of uplink grants and uplink frequency resources that support frequency selective precoder indication in wireless communications in accordance with aspects of the present disclosure.

FIG. 3 illustrates an example of an uplink grant and uplink frequency resources 300 that supports frequency selective precoder indication in wireless communications in accordance with aspects of the present disclosure. In some examples, the uplink grant and uplink frequency resources 300 may implement aspects of the wireless communications systems 100 and 200, as described with reference to FIGS. 1 and 2.

In this example, a base station (e.g., a base station 105 as described herein) or other network node may allocate resources for an uplink transmission from a UE (e.g., a UE 115 as described herein), and transmit an indication of an uplink grant in DCI 305. The DCI 305 may include multiple precoder indicators, such as a first precoder indicator in a SRI1 or TMPI1 field, and a second precoder indicator in a SRI2 or TPMI2 field. Further, as discussed herein, the DCI 305 may be for a single antenna panel transmission (e.g., as indicated by a single TPC for the PUSCH, a single set of power control parameters for the PUSCH, a single TCI state for the PUSCH, or combinations thereof).

In a first example, the DCI 305 may allocate uplink resources that are configured for intra-slot hopping 310 within a slot 315. In this example, when the UE is scheduled with a PUSCH with frequency hopping, a first precoder is associated with a first frequency hop 320 of the PUSCH, where the first precoder is based on the association with the first SRS resource set (e.g., indicated by SRI1/TPMI1). In some cases, the first frequency hop 320 may be associated with a first portion of a frequency domain resource assignment (FDRA) that is provided in the uplink grant in the DCI 305. In this example, a second precoder is associated with a second frequency hop 325 of the PUSCH, where the second precoder is based on the association with the second SRS resource set (e.g., indicated by SRI2/TPMI2). In some cases, the second frequency hop 325 may be associated with a second portion of the FDRA that is provided in the uplink grant in the DCI 305.

In a second example, the DCI 305 may allocate uplink resources that are configured for inter-slot hopping 330 in which a first frequency hop 335 is transmitted in a first slot 340 and a second frequency hop 345 is transmitted in a second slot 350. In this example, when the UE is scheduled with a PUSCH with frequency hopping, a first precoder is associated with a first frequency hop 335 of the PUSCH, where the first precoder is based on the association with the first SRS resource set (e.g., indicated by SRI1/TPMI1), and the first frequency hop 335 uses uplink frequency domain resources that are allocated in a FDRA that is provided in the uplink grant in the DCI 305. In this example, a second precoder is associated with the second frequency hop 345 of the PUSCH, where the second precoder is based on the association with the second SRS resource set (e.g., indicated by SRI2/TPMI2) and the second frequency hop 345 uses frequency resources based on the FDRA provided in the DCI 305 plus an offset (e.g., a frequency offset that is indicated in a frequency hopping configuration that is provided in RRC signaling).

Figure 4:
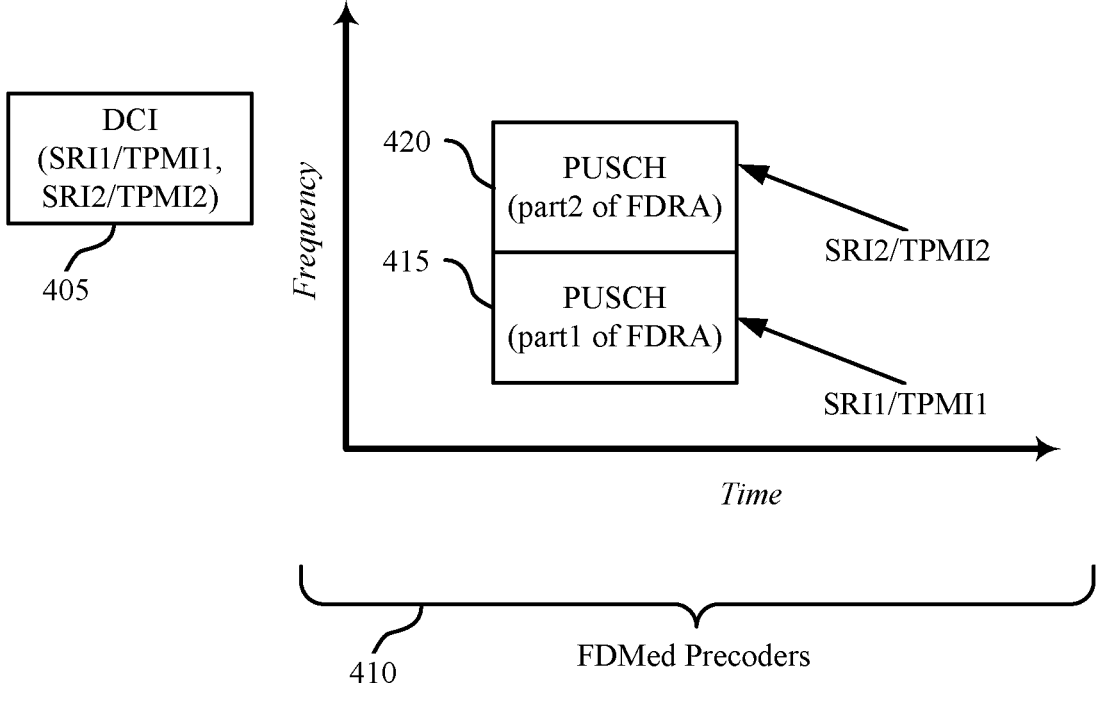

FIG. 4 illustrates another example of an uplink grant and uplink frequency resources 400 that support frequency selective precoder indication in wireless communications in accordance with aspects of the present disclosure. In some examples, the uplink grant and uplink frequency resources 400 may implement aspects of the wireless communications systems 100 and 200, as described with reference to FIGS. 1 and 2.

In this example, a base station (e.g., a base station 105 as described herein) or other network node may allocate resources for an uplink transmission from a UE (e.g., a UE 115 as described herein), and transmit an indication of an uplink grant in DCI 405. The DCI 405 may include multiple precoder indicators, such as a first precoder indicator in a SRI1 or TMPI1 field, and a second precoder indicator in a SRI2 or TPMI2 field. In some examples, the multiple precoder indicator may have a joint field in the DCI 405 for SRI1 or TMPI1, and SRI2 or TMPI2. Further, as discussed herein, the DCI 405 may be for a single antenna panel transmission (e.g., as indicated by a single TPC for the PUSCH, a single set of power control parameters for the PUSCH, a single TCI state for the PUSCH, or combinations thereof).

In this example, the DCI 405 may allocate uplink resources that are contiguous frequency resources within a same set of time domain resources such that FDMed precoders 410 are provided. The contiguous frequency resources, in this example, may include a first portion 415 of the frequency domain resources and a second portion 420 of the frequency domain resources. In some cases, first precoder is used for the first portion 415 of the frequency domain resources, which may be associated with a first part of a FDRA that is provided in the uplink grant in the DCI 405. In this example, a second precoder is used for the second portion 425 of the frequency domain resources, which may be associated with a second part of the FDRA that is provided in the uplink grant in the DCI 405. In some cases a partition of the contiguous frequency domain resources may be predetermined, or may be indicated in the DCI 405, or may be configured (e.g., by RRC signaling or in a MAC-CE). In some cases, the partition of the contiguous frequency domain resources for PUSCH may be the wideband frequency of the uplink grant, where each partition is one half of the wideband frequency domain resources. In other cases, the partition of the contiguous frequency domain resources for PUSCH may be an interleaved partition, in the unit of resource blocks, or resource block groups.

Figure 5:
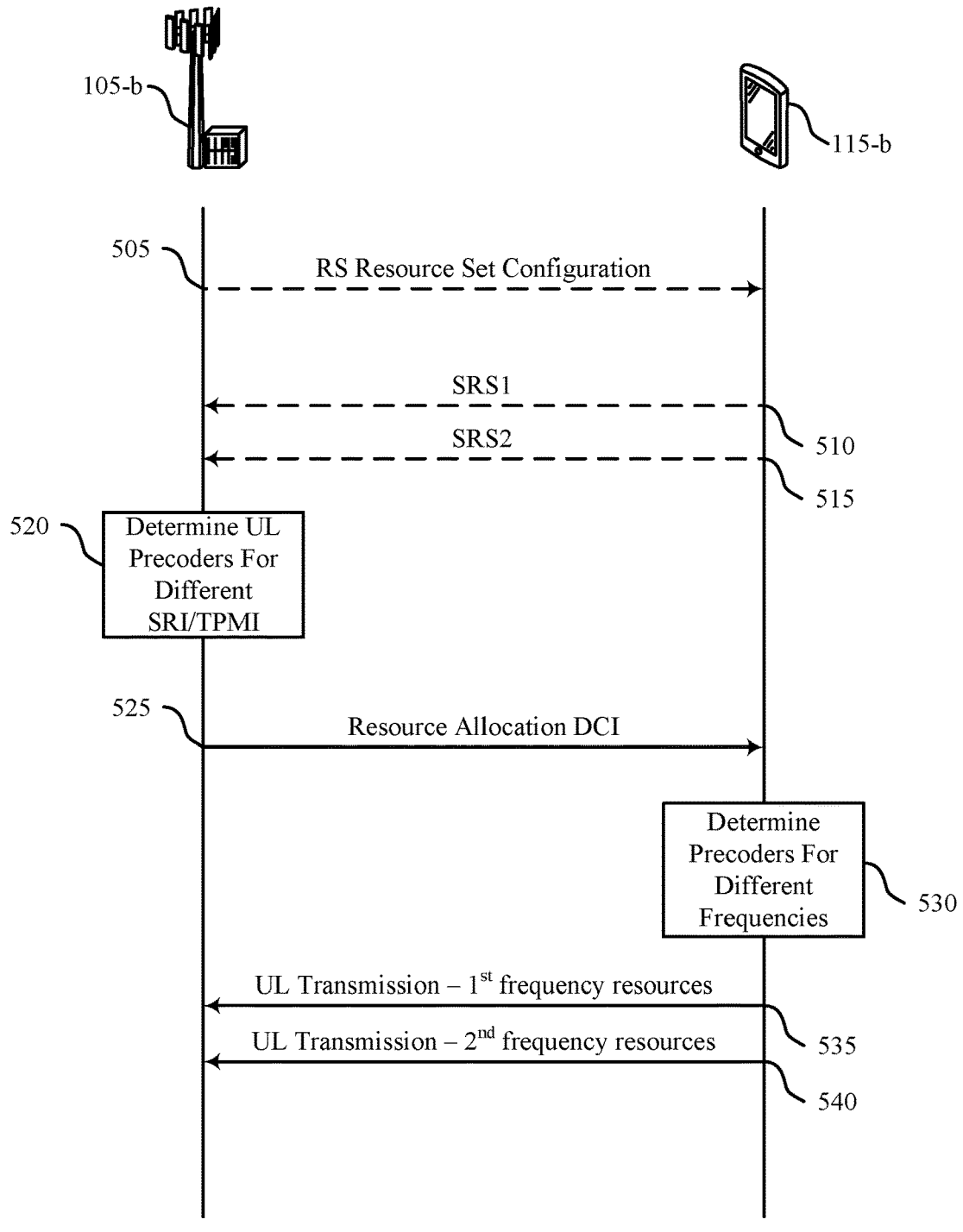
FIG. 5 illustrates an example of a process flow that supports frequency selective precoder indication in wireless communications in accordance with aspects of the present disclosure.

FIG. 5 illustrates an example of a process flow 500 that supports frequency selective precoder indication in wireless communications in accordance with aspects of the present disclosure. In some examples, process flow 500 may implement aspects of wireless communications systems 100 and 200. For example, process flow 500 may include a base station 105-b and a UE 115-b, which may represent examples of corresponding base stations 105 and UEs 115, respectively, as described with reference to FIGS. 1-4.

In the following description of the process flow 500, the operations between UE 115-b and base station 105-b may be transmitted in a different order than the exemplary order shown, or the operations performed by UE 115-b and base station 105-b may be performed in different orders or at different times. Certain operations may also be left out of the process flow 500, or other operations may be added to the process flow 500. It is to be understood that while UE 115-b and base station 105-b are shown performing a number of the operations of process flow 500, any wireless device may perform the operations shown.

Optionally, at 505, UE 115-b may receive a reference signal resource set configuration from base station 105-b. In some cases, the reference signal resource set configuration may include configuration information for one or more reference signals (e.g., SRSs) that may use indicate a number of different frequency domain resources for the one or more reference signals.

Based on the reference signal resource set configuration the UE 115-b, at 510, may transmit a first uplink reference signal (e.g., SRS1) to the base station 105-b. In this example, the UE 115-b, at 515, may also transmit a second uplink reference signal (e.g., SRS2) to the base station 105-b. In some cases, each reference signal may be transmitted on different uplink frequency resources, in accordance with the reference signal resource set configuration.

At 520, the base station 105-b may determine uplink precoders for different SRI/TPMI indicators. In some cases, the base station 105-b may measure the reference signals received from the UE 115-b, and may determine multiple uplink precoder indications (e.g., multiple SRI/TPMI indications) that provide for enhanced likelihood of successful receipt of uplink communications from the UE 115-b. At 525, the base station 105-b may transmit an uplink resource allocation to the UE 115-b in a DCI. In some cases, the uplink resource allocation may indicate multiple (e.g., two) precoder indications for a PUSCH allocation for the UE 115-b, and may also indicate that the PUSCH allocation is for a single antenna panel transmission at the UE 115-b.

At 530, the UE 115-b may determine precoders that are to be used for different portions of frequency domain resources that are allocated in the resource allocation DCI. As discussed herein, the precoders may be determined based on a SRIs/TPMIs that are provided in the DCI. At 535, the UE 115-b may transmit a first portion of the uplink transmission using a first portion of the allocated uplink frequency domain resources, using a first precoding. At 540, the UE 115-b may transmit a second portion of the uplink transmission using a second portion of the allocated uplink frequency domain resources, using a second precoding. Thus, frequency selective precoding is used for the PUSCH transmission based on the allocated resources and precoding indications provided in the DCI.

Figure 6:
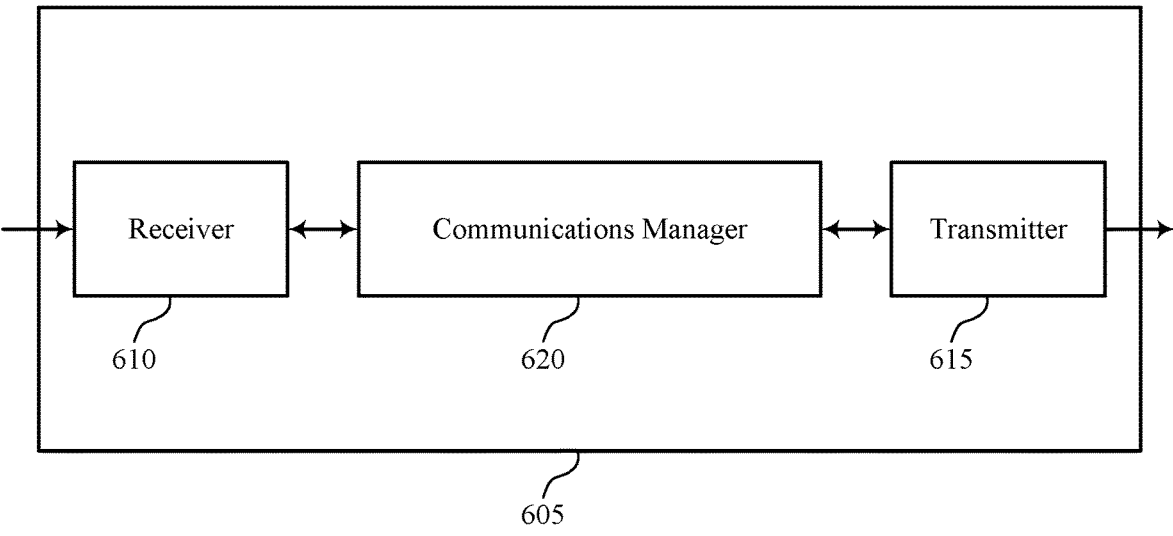
FIGS. 6 and 7 show block diagrams of devices that support frequency selective precoder indication in wireless communications in accordance with aspects of the present disclosure.

FIG. 6 shows a block diagram 600 of a device 605 that supports frequency selective precoder indication in wireless communications in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to frequency selective precoder indication in wireless communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to frequency selective precoder indication in wireless communications). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of frequency selective precoder indication in wireless communications as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for receiving control information having a resource grant for an uplink communication from the UE to a base station, the uplink communication using a single antenna panel at the UE, where the control information allocates frequency resources for the uplink communication, and includes a first precoding indication that is associated with a first subset of the frequency resources and a second precoding indication that is associated with a second subset of the frequency resources. The communications manager 620 may be configured as or otherwise support a means for transmitting a first portion of the uplink communication via the first subset of the frequency resources using a first precoder that is based on the first precoding indication. The communications manager 620 may be configured as or otherwise support a means for transmitting a second portion of the uplink communication via the second subset of the frequency resources using a second precoder that is based on the second precoding indication.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for frequency selective precoding for a single panel uplink transmission that may enhance the likelihood of successful reception of an uplink communication, and thereby enhance network capacity, latency, and reliability. Such techniques may provide increased reliability for wireless communications and may increase reliability in MIMO communications, resulting in more efficient and reliable wireless communications, thereby increasing data rates and link capacity.

Figure 7:
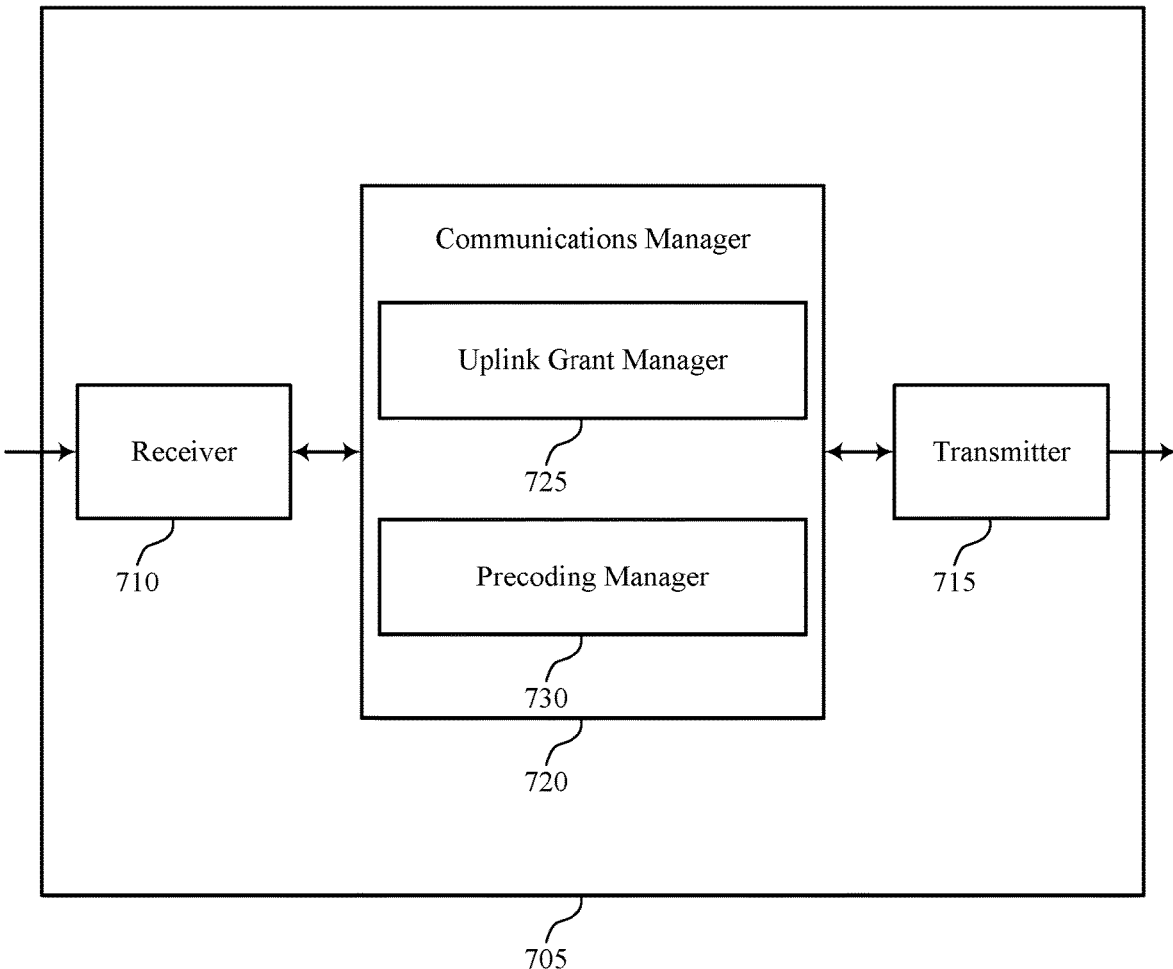

FIG. 7 shows a block diagram 700 of a device 705 that supports frequency selective precoder indication in wireless communications in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to frequency selective precoder indication in wireless communications). Information may be passed on to other components of the device 705. The receiver 710 may utilize a single antenna or a set of multiple antennas.

The transmitter 715 may provide a means for transmitting signals generated by other components of the device 705.

For example, the transmitter 715 may transmit information such as packets, user data, control information, or any combination thereof associated with various information channels (e.g., control channels, data channels, information channels related to frequency selective precoder indication in wireless communications). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of frequency selective precoder indication in wireless communications as described herein. For example, the communications manager 720 may include an uplink grant manager 725 a precoding manager 730, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The uplink grant manager 725 may be configured as or otherwise support a means for receiving control information having a resource grant for an uplink communication from the UE to a base station, the uplink communication using a single antenna panel at the UE, where the control information allocates frequency resources for the uplink communication, and includes a first precoding indication that is associated with a first subset of the frequency resources and a second precoding indication that is associated with a second subset of the frequency resources. The precoding manager 730 may be configured as or otherwise support a means for transmitting a first portion of the uplink communication via the first subset of the frequency resources using a first precoder that is based on the first precoding indication. The precoding manager 730 may be configured as or otherwise support a means for transmitting a second portion of the uplink communication via the second subset of the frequency resources using a second precoder that is based on the second precoding indication.

Figure 8:
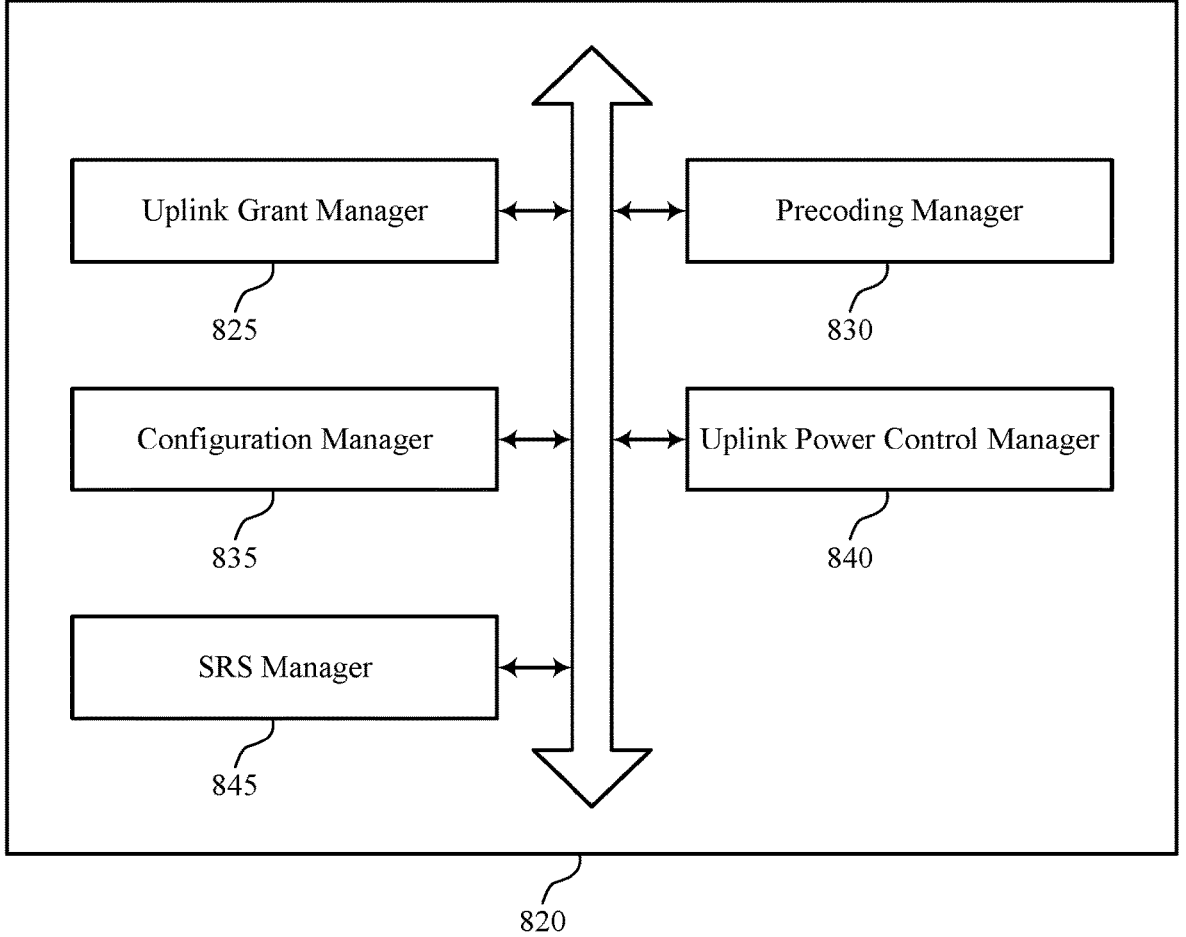
FIG. 8 shows a block diagram of a communications manager that supports frequency selective precoder indication in wireless communications in accordance with aspects of the present disclosure.

FIG. 8 shows a block diagram 800 of a communications manager 820 that supports frequency selective precoder indication in wireless communications in accordance with aspects of the present disclosure. The communications manager 820 may be an example of aspects of a communications manager 620, a communications manager 720, or both, as described herein. The communications manager 820, or various components thereof, may be an example of means for performing various aspects of frequency selective precoder indication in wireless communications as described herein. For example, the communications manager 820 may include an uplink grant manager 825, a precoding manager 830, a configuration manager 835, an uplink power control manager 840, an SRS manager 845, or any combination thereof. Each of these components may communicate, directly or indirectly, with one another (e.g., via one or more buses).

The communications manager 820 may support wireless communication at a UE in accordance with examples as disclosed herein. The uplink grant manager 825 may be configured as or otherwise support a means for receiving control information having a resource grant for an uplink communication from the UE to a base station, the uplink communication using a single antenna panel at the UE, where the control information allocates frequency resources for the uplink communication, and includes a first precoding indication that is associated with a first subset of the frequency resources and a second precoding indication that is associated with a second subset of the frequency resources. The precoding manager 830 may be configured as or otherwise support a means for transmitting a first portion of the uplink communication via the first subset of the frequency resources using a first precoder that is based on the first precoding indication. In some examples, the precoding manager 830 may be configured as or otherwise support a means for transmitting a second portion of the uplink communication via the second subset of the frequency resources using a second precoder that is based on the second precoding indication.

In some examples, the configuration manager 835 may be configured as or otherwise support a means for receiving configuration information for a first uplink reference signal resource set and a second uplink reference signal resource set, and where the first precoding indication is associated with the first uplink reference signal resource set and the second precoding indication is associated with the second uplink reference signal resource set.

In some examples, the first uplink reference signal resource set is identified by a first SRI that is provided in the control information and is associated with the first precoding indication, and the second uplink reference signal resource set is identified by a second SRI that is provided in the control information and is associated with the second precoding indication. In some examples, the first uplink reference signal resource set and the second uplink reference signal resource set are each configured for codebook-based or non-codebook-based MIMO communications.

In some examples, the control information includes a single transmit power command for the uplink communication from the UE to the base station. In some examples, the control information includes a single set of power control parameters for the uplink communication from the UE to the base station. In some examples, the single set of power control parameters includes one or more of a path loss reference signal, a fractional power control parameter, a nominal transmit power, an index value associated with a power control procedure, or any combinations thereof. In some examples, the control information includes a single TCI, and both of the first precoding indication and the second precoding indication, for the uplink communication from the UE to the base station.

In some examples, the first subset of the frequency resources is associated with a first frequency hop for the uplink communication, and the second subset of the frequency resources is associated with a second frequency hop for the uplink communication. In some examples, the first frequency hop and the second frequency hop are intra-slot frequency hops or inter-slot frequency hops. In some examples, the control information includes one or more of a first frequency allocation indication associated with the first frequency hop, a second frequency allocation indication associated with the second frequency hop, a time domain offset value for the second frequency hop, a frequency domain offset value for the second frequency hop, or any combinations thereof.

In some examples, the frequency resources for the uplink communication span a contiguous set of frequency resources in a same time domain resource. In some examples, the first subset of the frequency resources and the second subset of the frequency resources occupy different contiguous portions of the contiguous set of frequency resources. In some examples, the first subset of the frequency resources is interleaved with the second subset of the frequency resources within the contiguous set of frequency resources.

Figure 9:
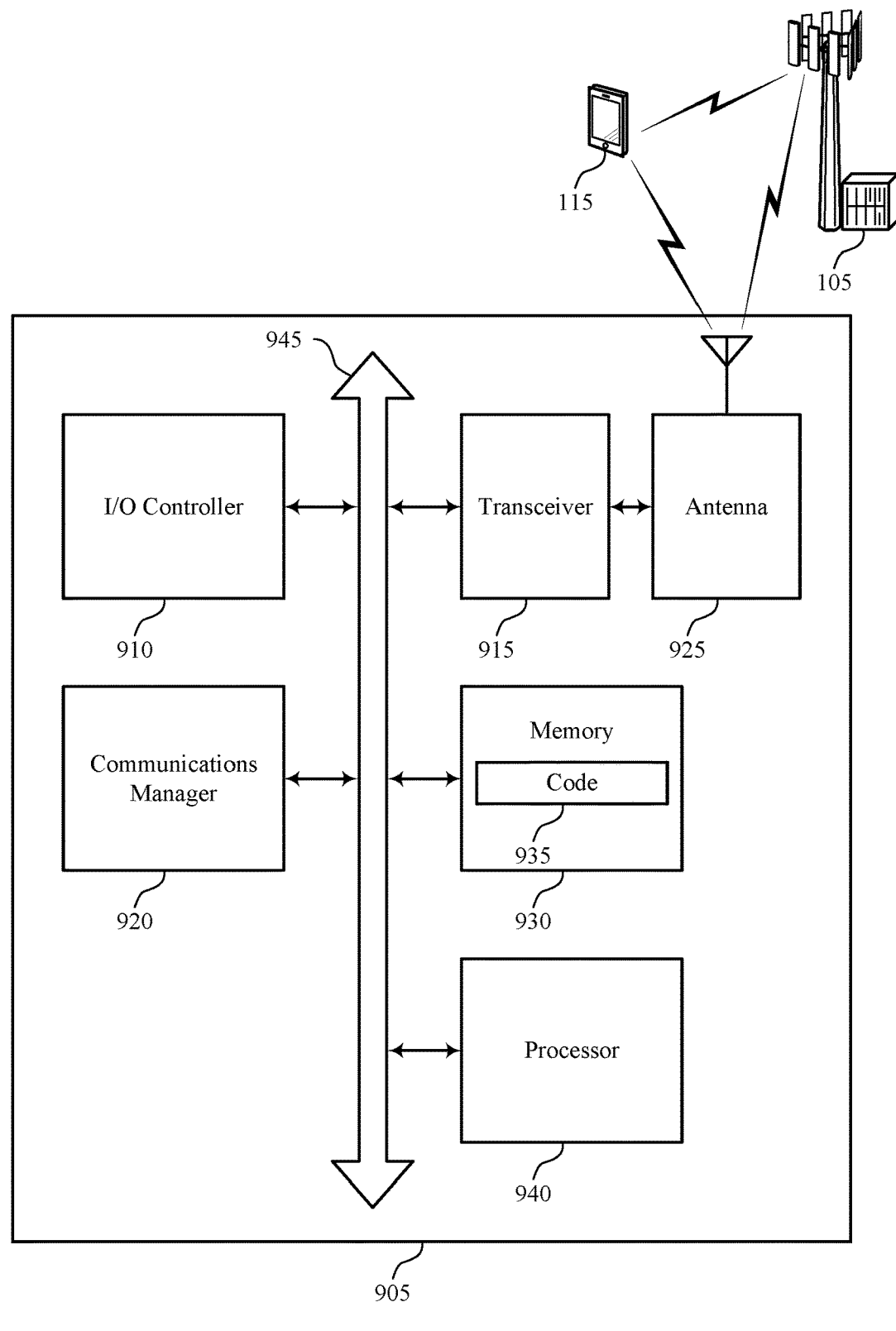
FIG. 9 shows a diagram of a system including a device that supports frequency selective precoder indication in wireless communications in accordance with aspects of the present disclosure.

FIG. 9 shows a diagram of a system 900 including a device 905 that supports frequency selective precoder indication in wireless communications in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting frequency selective precoder indication in wireless communications). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving control information having a resource grant for an uplink communication from the UE to a base station, the uplink communication using a single antenna panel at the UE, where the control information allocates frequency resources for the uplink communication, and includes a first precoding indication that is associated with a first subset of the frequency resources and a second precoding indication that is associated with a second subset of the frequency resources. The communications manager 920 may be configured as or otherwise support a means for transmitting a first portion of the uplink communication via the first subset of the frequency resources using a first precoder that is based on the first precoding indication. The communications manager 920 may be configured as or otherwise support a means for transmitting a second portion of the uplink communication via the second subset of the frequency resources using a second precoder that is based on the second precoding indication.

By including or configuring the communications manager 920 in accordance with examples as described herein, the device 905 may support techniques for frequency selective precoding for a single panel uplink transmission that may enhance the likelihood of successful reception of an uplink communication, and thereby enhance network capacity, latency, and reliability. Such techniques may provide increased reliability for wireless communications and may increase reliability in MIMO communications, resulting in more efficient and reliable wireless communications, thereby increasing data rates and link capacity.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of frequency selective precoder indication in wireless communications as described herein, or the processor 940 and the memory 930 may be otherwise configured to perform or support such operations.

Figure 10:
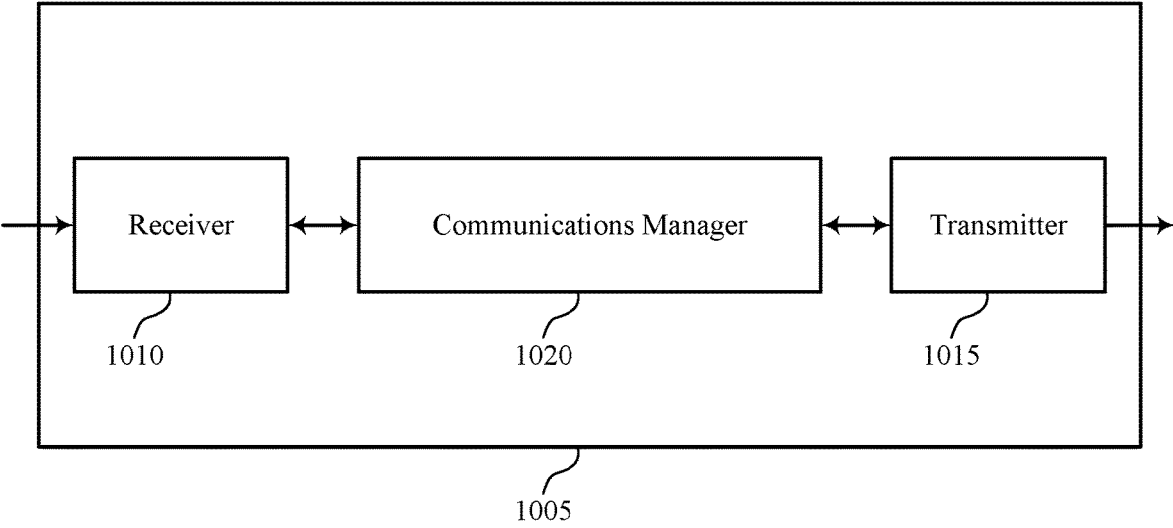
FIGS. 10 and 11 show block diagrams of devices that support frequency selective precoder indication in wireless communications in accordance with aspects of the present disclosure.

FIG. 10 shows a block diagram 1000 of a device 1005 that supports frequency selective precoder indication in wireless communications in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to frequency selective precoder indication in wireless communications). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to frequency selective precoder indication in wireless communications). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of frequency selective precoder indication in wireless communications as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. For example, the communications manager 1020 may be configured as or otherwise support a means for allocating a set of resources to a UE for an uplink communication from the UE to the base station, the set of resources including a set of frequency resources and a set of time domain resources, where the uplink communication uses a single antenna panel at the UE. The communications manager 1020 may be configured as or otherwise support a means for determining a first precoding indication for a first subset of the set of frequency resources, and a second precoding indication for a second subset of the set of frequency resources. The communications manager 1020 may be configured as or otherwise support a means for transmitting, to the UE, control information having a resource grant for the uplink communication from the UE, where the control information allocates the set of frequency resources for the uplink communication and includes the first precoding indication and the second precoding indication.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for frequency selective precoding for a single panel uplink transmission that may enhance the likelihood of successful reception of an uplink communication, and thereby enhance network capacity, latency, and reliability. Such techniques may provide increased reliability for wireless communications and may increase reliability in MIMO communications, resulting in more efficient and reliable wireless communications, thereby increasing data rates and link capacity.

Figure 11:
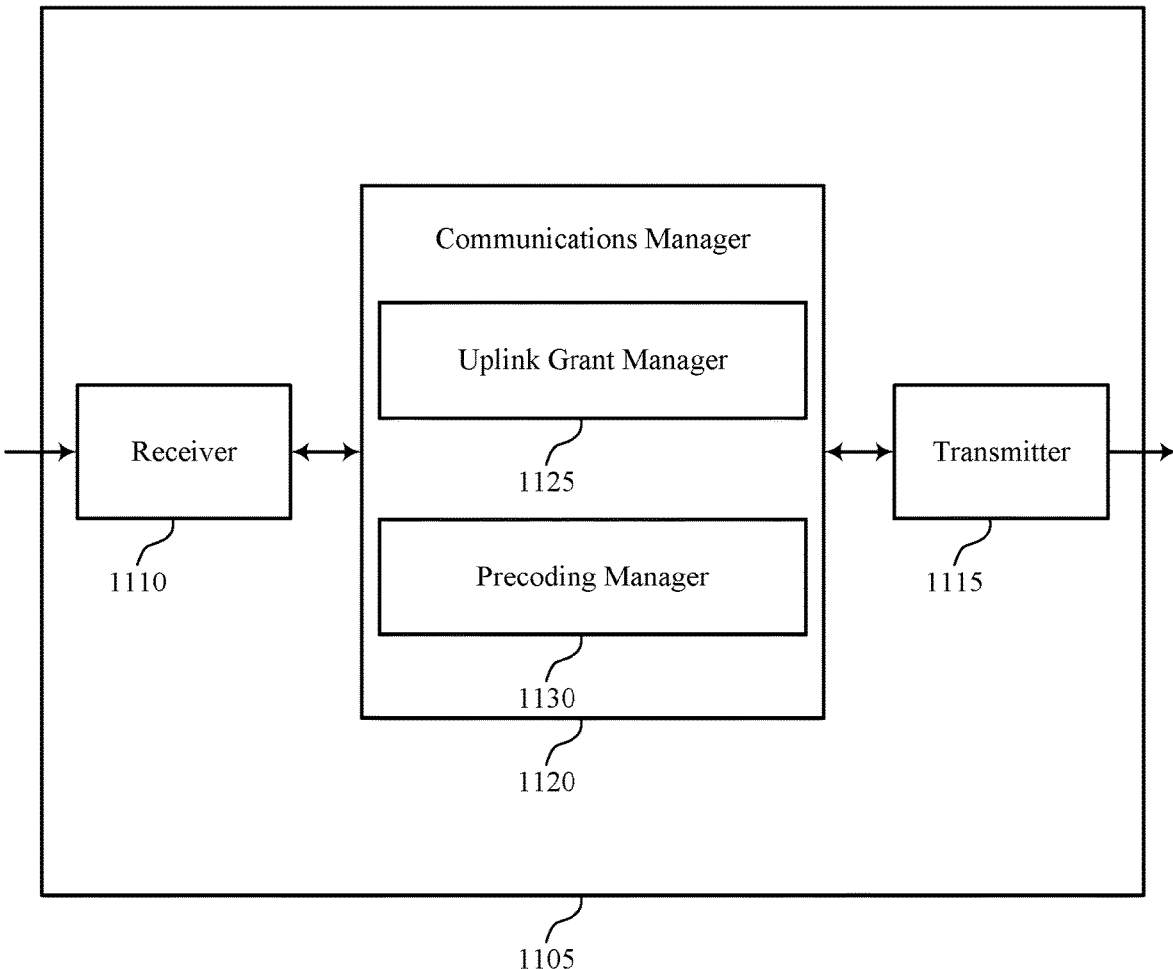

FIG. 11 shows a block diagram 1100 of a device 1105 that supports frequency selective precoder indication in wireless communications in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to frequency selective precoder indication in wireless communications). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to frequency selective precoder indication in wireless communications). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of frequency selective precoder indication in wireless communications as described herein. For example, the communications manager 1120 may include an uplink grant manager 1125 a precoding manager 1130, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. The uplink grant manager 1125 may be configured as or otherwise support a means for allocating a set of resources to a UE for an uplink communication from the UE to the base station, the set of resources including a set of frequency resources and a set of time domain resources, where the uplink communication uses a single antenna panel at the UE. The precoding manager 1130 may be configured as or otherwise support a means for determining a first precoding indication for a first subset of the set of frequency resources, and a second precoding indication for a second subset of the set of frequency resources. The uplink grant manager 1125 may be configured as or otherwise support a means for transmitting, to the UE, control information having a resource grant for the uplink communication from the UE, where the control information allocates the set of frequency resources for the uplink communication and includes the first precoding indication and the second precoding indication.

Figure 12:
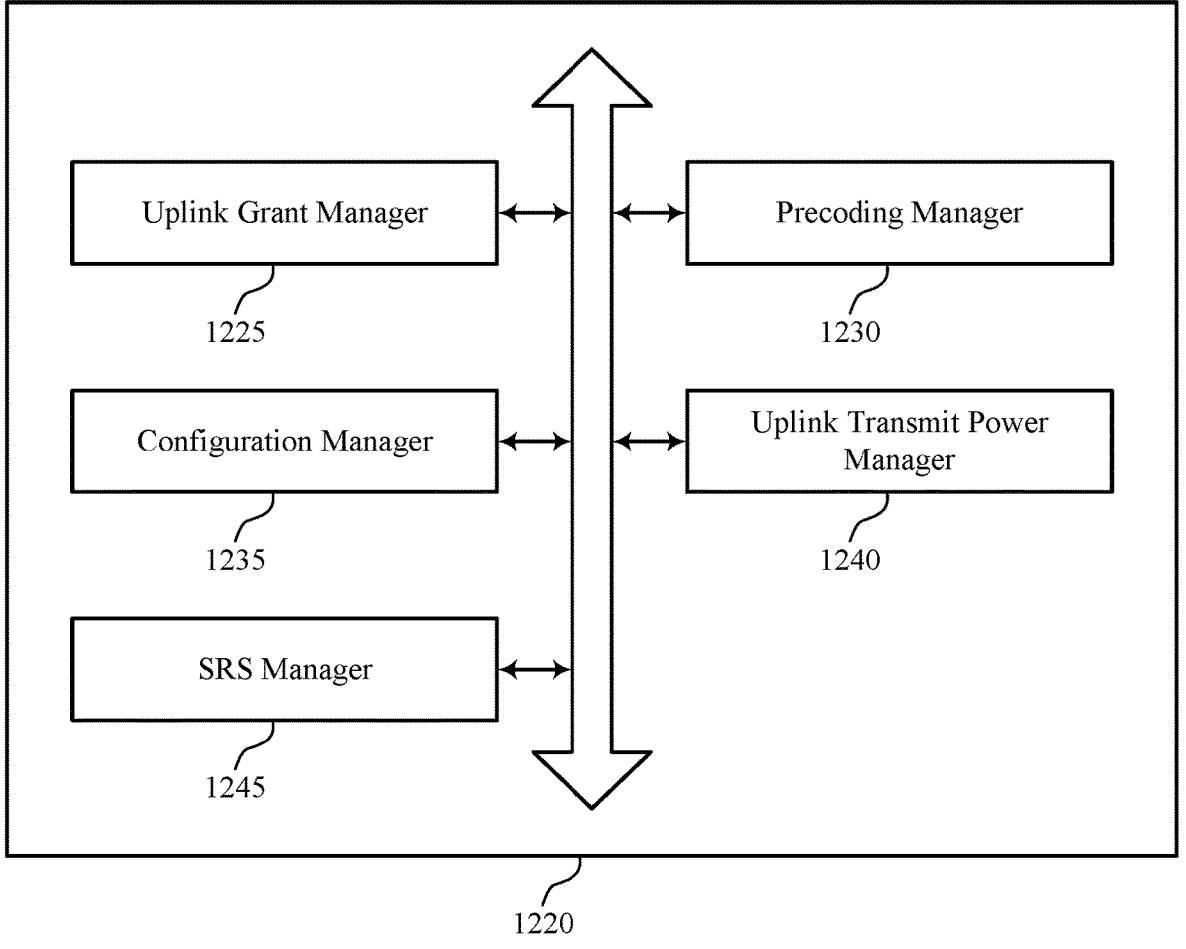
FIG. 12 shows a block diagram of a communications manager that supports frequency selective precoder indication in wireless communications in accordance with aspects of the present disclosure.

FIG. 12 shows a block diagram 1200 of a communications manager 1220 that supports frequency selective precoder indication in wireless communications in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of frequency selective precoder indication in wireless communications as described herein. For example, the communications manager 1220 may include an uplink grant manager 1225, a precoding manager 1230, a configuration manager 1235, an uplink transmit power manager 1240, an SRS manager 1245, or any combination thereof. Each of these components may communicate, directly or indirectly, with one another (e.g., via one or more buses).

The communications manager 1220 may support wireless communication at a base station in accordance with examples as disclosed herein. The uplink grant manager 1225 may be configured as or otherwise support a means for allocating a set of resources to a UE for an uplink communication from the UE to the base station, the set of resources including a set of frequency resources and a set of time domain resources, where the uplink communication uses a single antenna panel at the UE. The precoding manager 1230 may be configured as or otherwise support a means for determining a first precoding indication for a first subset of the set of frequency resources, and a second precoding indication for a second subset of the set of frequency resources. In some examples, the uplink grant manager 1225 may be configured as or otherwise support a means for transmitting, to the UE, control information having a resource grant for the uplink communication from the UE, where the control information allocates the set of frequency resources for the uplink communication and includes the first precoding indication and the second precoding indication.

In some examples, the configuration manager 1235 may be configured as or otherwise support a means for configuring the UE with a first uplink reference signal resource set and a second uplink reference signal resource set, and where the first precoding indication is associated with the first uplink reference signal resource set and the second precoding indication is associated with the second uplink reference signal resource set.

In some examples, the first uplink reference signal resource set is identified by a first SRI that is provided in the control information and is associated with the first precoding indication, and the second uplink reference signal resource set is identified by a second SRI that is provided in the control information and is associated with the second precoding indication. In some examples, the first uplink reference signal resource set and the second uplink reference signal resource set are each configured for codebook-based or non-codebook-based MIMO communications.

In some examples, the control information includes a single transmit power command for the uplink communication from the UE to the base station. In some examples, the control information includes a single set of power control parameters for the uplink communication from the UE to the base station. In some examples, the single set of power control parameters includes one or more of a path loss reference signal, a fractional power control parameter, a nominal transmit power, an index value associated with a power control procedure, or any combinations thereof. In some examples, the control information includes a single TCI, and both of the first precoding indication and the second precoding indication, for the uplink communication from the UE to the base station.

In some examples, the first subset of the set of frequency resources is associated with a first frequency hop for the uplink communication, and the second subset of the set of frequency resources is associated with a second frequency hop for the uplink communication. In some examples, the first frequency hop and the second frequency hop are intra-slot frequency hops or inter-slot frequency hops. In some examples, the control information includes one or more of a first frequency allocation indication associated with the first frequency hop, a second frequency allocation indication associated with the second frequency hop, a time or frequency domain offset value for the second frequency hop, or any combinations thereof.

In some examples, the set of frequency resources for the uplink communication span contiguous frequency resources in a same time domain resource. In some examples, the first subset of the set of frequency resources and the second subset of the set of frequency resources occupy different contiguous portions of the set of frequency resources. In some examples, the first subset of the set of frequency resources is interleaved with the second subset of the set of frequency resources.

Figure 13:
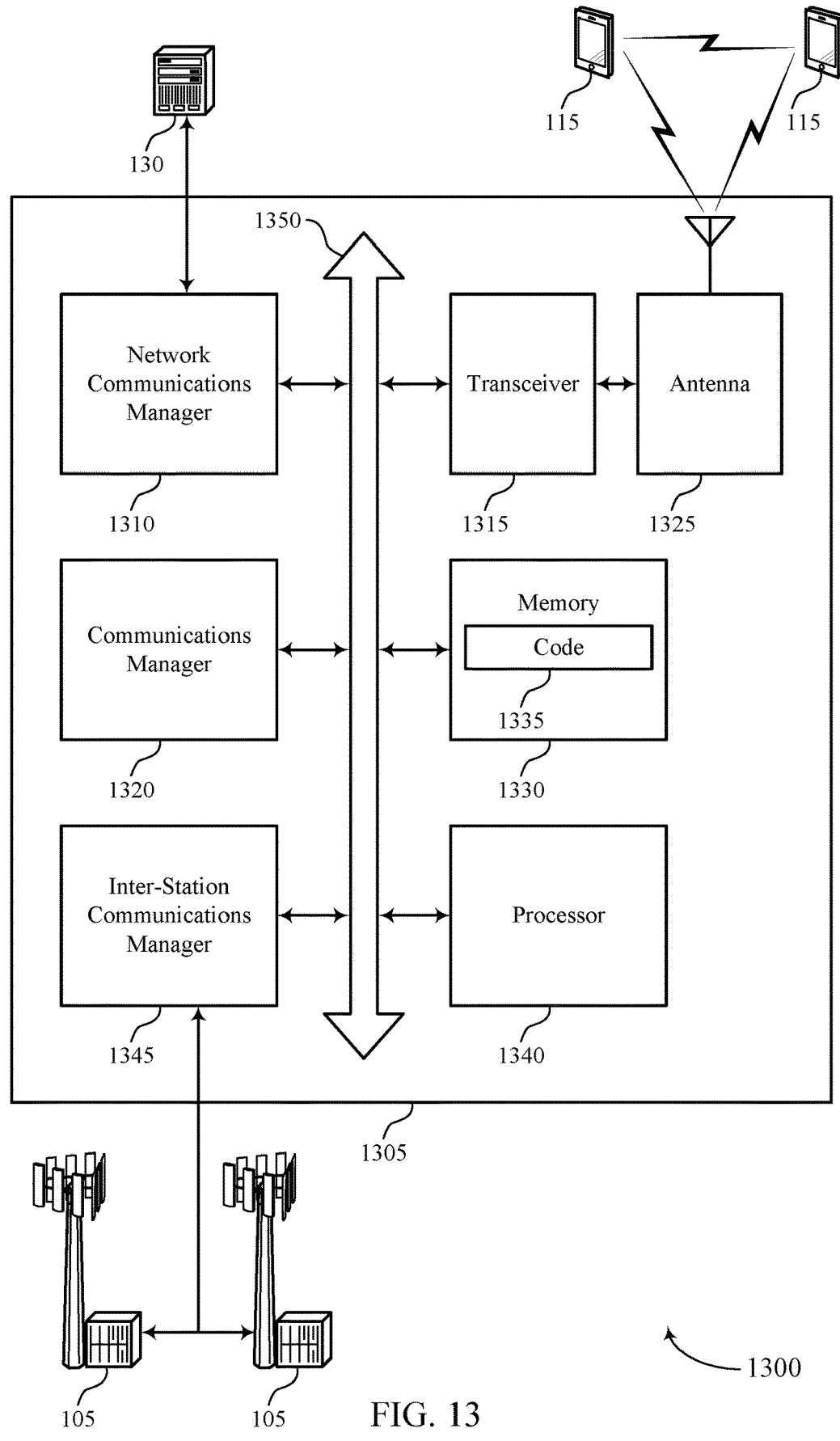
FIG. 13 shows a diagram of a system including a device that supports frequency selective precoder indication in wireless communications in accordance with aspects of the present disclosure.

FIG. 13 shows a diagram of a system 1300 including a device 1305 that supports frequency selective precoder indication in wireless communications in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting frequency selective precoder indication in wireless communications). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a base station in accordance with examples as disclosed herein. For example, the communications manager 1320 may be configured as or otherwise support a means for allocating a set of resources to a UE for an uplink communication from the UE to the base station, the set of resources including a set of frequency resources and a set of time domain resources, where the uplink communication uses a single antenna panel at the UE. The communications manager 1320 may be configured as or otherwise support a means for determining a first precoding indication for a first subset of the set of frequency resources, and a second precoding indication for a second subset of the set of frequency resources. The communications manager 1320 may be configured as or otherwise support a means for transmitting, to the UE, control information having a resource grant for the uplink communication from the UE, where the control information allocates the set of frequency resources for the uplink communication and includes the first precoding indication and the second precoding indication.

By including or configuring the communications manager 1320 in accordance with examples as described herein, the device 1305 may support techniques for frequency selective precoding for a single panel uplink transmission that may enhance the likelihood of successful reception of an uplink communication, and thereby enhance network capacity, latency, and reliability. Such techniques may provide increased reliability for wireless communications and may increase reliability in MIMO communications, resulting in more efficient and reliable wireless communications, thereby increasing data rates and link capacity.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of frequency selective precoder indication in wireless communications as described herein, or the processor 1340 and the memory 1330 may be otherwise configured to perform or support such operations.

FIG. 14 shows a flowchart illustrating a method 1400 that supports frequency selective precoder indication in wireless communications in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving control information having a resource grant for an uplink communication from the UE to a base station, the uplink communication using a single antenna panel at the UE, where the control information allocates frequency resources for the uplink communication, and includes a first precoding indication that is associated with a first subset of the frequency resources and a second precoding indication that is associated with a second subset of the frequency resources. The operations of 1405 may be performed in accordance with examples as disclosed herein. In some examples, aspects of the operations of 1405 may be performed by an uplink grant manager 825 as described with reference to FIG. 8.

At 1410, the method may include transmitting a first portion of the uplink communication via the first subset of the frequency resources using a first precoder that is based on the first precoding indication. The operations of 1410 may be performed in accordance with examples as disclosed herein. In some examples, aspects of the operations of 1410 may be performed by a precoding manager 830 as described with reference to FIG. 8.

At 1415, the method may include transmitting a second portion of the uplink communication via the second subset of the frequency resources using a second precoder that is based on the second precoding indication. The operations of 1415 may be performed in accordance with examples as disclosed herein. In some examples, aspects of the operations of 1415 may be performed by a precoding manager 830 as described with reference to FIG. 8.

FIG. 15 shows a flowchart illustrating a method 1500 that supports frequency selective precoder indication in wireless communications in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving configuration information for a first uplink reference signal resource set and a second uplink reference signal resource set, and where the first precoding indication is associated with the first uplink reference signal resource set and the second precoding indication is associated with the second uplink reference signal resource set. The operations of 1505 may be performed in accordance with examples as disclosed herein. In some examples, aspects of the operations of 1505 may be performed by a configuration manager 835 as described with reference to FIG. 8. In some cases, the first uplink reference signal resource set being identified by a first SRS resource indicator (SRI) that is provided in the control information and is associated with the first precoding indication, and the second uplink reference signal resource set is identified by a second SRI that is provided in the control information and is associated with the second precoding indication. In some cases, the first uplink reference signal resource set and the second uplink reference signal resource set being each configured for codebook-based or non-codebook-based MIMO communications.

At 1510, the method may include receiving control information having a resource grant for an uplink communication from the UE to a base station, the uplink communication using a single antenna panel at the UE, where the control information allocates frequency resources for the uplink communication, and includes a first precoding indication that is associated with a first subset of the frequency resources and a second precoding indication that is associated with a second subset of the frequency resources. The operations of 1510 may be performed in accordance with examples as disclosed herein. In some examples, aspects of the operations of 1510 may be performed by an uplink grant manager 825 as described with reference to FIG. 8.

At 1515, the method may include transmitting a first portion of the uplink communication via the first subset of the frequency resources using a first precoder that is based on the first precoding indication. The operations of 1515 may be performed in accordance with examples as disclosed herein. In some examples, aspects of the operations of 1515 may be performed by a precoding manager 830 as described with reference to FIG. 8.

At 1520, the method may include transmitting a second portion of the uplink communication via the second subset of the frequency resources using a second precoder that is based on the second precoding indication. The operations of 1520 may be performed in accordance with examples as disclosed herein. In some examples, aspects of the operations of 1520 may be performed by a precoding manager 830 as described with reference to FIG. 8.

FIG. 16 shows a flowchart illustrating a method 1600 that supports frequency selective precoder indication in wireless communications in accordance with aspects of the present disclosure. The operations of the method 1600 may be implemented by a base station or its components as described herein. For example, the operations of the method 1600 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1605, the method may include allocating a set of resources to a UE for an uplink communication from the UE to the base station, the set of resources including a set of frequency resources and a set of time domain resources, where the uplink communication uses a single antenna panel at the UE. The operations of 1605 may be performed in accordance with examples as disclosed herein. In some examples, aspects of the operations of 1605 may be performed by an uplink grant manager 1225 as described with reference to FIG. 12.

At 1610, the method may include determining a first precoding indication for a first subset of the set of frequency resources, and a second precoding indication for a second subset of the set of frequency resources. The operations of 1610 may be performed in accordance with examples as disclosed herein. In some examples, aspects of the operations of 1610 may be performed by a precoding manager 1230 as described with reference to FIG. 12.

At 1615, the method may include transmitting, to the UE, control information having a resource grant for the uplink communication from the UE, where the control information allocates the set of frequency resources for the uplink communication and includes the first precoding indication and the second precoding indication. The operations of 1615 may be performed in accordance with examples as disclosed herein. In some examples, aspects of the operations of 1615 may be performed by an uplink grant manager 1225 as described with reference to FIG. 12.

FIG. 17 shows a flowchart illustrating a method 1700 that supports frequency selective precoder indication in wireless communications in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include configuring the UE with a first uplink reference signal resource set and a second uplink reference signal resource set, and where the first precoding indication is associated with the first uplink reference signal resource set and the second precoding indication is associated with the second uplink reference signal resource set. The operations of 1705 may be performed in accordance with examples as disclosed herein. In some examples, aspects of the operations of 1705 may be performed by a configuration manager 1235 as described with reference to FIG. 12.

At 1710, the method may include allocating a set of resources to a UE for an uplink communication from the UE to the base station, the set of resources including a set of frequency resources and a set of time domain resources, where the uplink communication uses a single antenna panel at the UE. The operations of 1710 may be performed in accordance with examples as disclosed herein. In some examples, aspects of the operations of 1710 may be performed by an uplink grant manager 1225 as described with reference to FIG. 12.

At 1715, the method may include determining a first precoding indication for a first subset of the set of frequency resources, and a second precoding indication for a second subset of the set of frequency resources. The operations of 1715 may be performed in accordance with examples as disclosed herein. In some examples, aspects of the operations of 1715 may be performed by a precoding manager 1230 as described with reference to FIG. 12.

At 1720, the method may include transmitting, to the UE, control information having a resource grant for the uplink communication from the UE, where the control information allocates the set of frequency resources for the uplink communication and includes the first precoding indication and the second precoding indication. The operations of 1720 may be performed in accordance with examples as disclosed herein. In some examples, aspects of the operations of 1720 may be performed by an uplink grant manager 1225 as described with reference to FIG. 12.

The following provides an overview of aspects of the present disclosure:

Aspect 1: A method for wireless communication at a UE, comprising: receiving control information having a resource grant for an uplink communication from the UE to a base station, the uplink communication using a single antenna panel at the UE, wherein the control information allocates frequency resources for the uplink communication, and includes a first precoding indication that is associated with a first subset of the frequency resources and a second precoding indication that is associated with a second subset of the frequency resources; transmitting a first portion of the uplink communication via the first subset of the frequency resources using a first precoder that is based at least in part on the first precoding indication; and transmitting a second portion of the uplink communication via the second subset of the frequency resources using a second precoder that is based at least in part on the second precoding indication.

Aspect 2: The method of aspect 1, further comprising: receiving configuration information for a first uplink reference signal resource set and a second uplink reference signal resource set, and wherein the first precoding indication is associated with the first uplink reference signal resource set and the second precoding indication is associated with the second uplink reference signal resource set.

Aspect 3: The method of aspect 2, wherein the first uplink reference signal resource set is identified by a first SRS resource indicator (SRI) that is provided in the control information and is associated with the first precoding indication, and the second uplink reference signal resource set is identified by a second SRI that is provided in the control information and is associated with the second precoding indication.

Aspect 4: The method of any of aspects 2 through 3, wherein the first uplink reference signal resource set and the second uplink reference signal resource set are each configured for codebook-based or non-codebook-based multiple input multiple output (MIMO) communications.

Aspect 5: The method of any of aspects 1 through 4, wherein the control information includes a single transmit power command for the uplink communication from the UE to the base station.

Aspect 6: The method of any of aspects 1 through 5, wherein the control information includes a single set of power control parameters for the uplink communication from the UE to the base station.

Aspect 7: The method of aspect 6, wherein the single set of power control parameters includes one or more of a path loss reference signal, a fractional power control parameter, a nominal transmit power, an index value associated with a power control procedure, or any combinations thereof.

Aspect 8: The method of any of aspects 1 through 7, wherein the control information includes a single transmission configuration indication (TCI), and both of the first precoding indication and the second precoding indication, for the uplink communication from the UE to the base station.

Aspect 9: The method of any of aspects 1 through 8, wherein the first subset of the frequency resources is associated with a first frequency hop for the uplink communication, and the second subset of the frequency resources is associated with a second frequency hop for the uplink communication.

Aspect 10: The method of aspect 9, wherein the first frequency hop and the second frequency hop are intra-slot frequency hops or inter-slot frequency hops.

Aspect 11: The method of any of aspects 9 through 10, wherein the control information includes one or more of a first frequency allocation indication associated with the first frequency hop, a second frequency allocation indication associated with the second frequency hop, a time domain offset value for the second frequency hop, or any combinations thereof.

Aspect 12: The method of any of aspects 1 through 8, wherein the frequency resources for the uplink communication span a contiguous set of frequency resources in a same time domain resource.

Aspect 13: The method of aspect 12, wherein the first subset of the frequency resources and the second subset of the frequency resources occupy different contiguous portions of the contiguous set of frequency resources.

Aspect 14: The method of any of aspects 12 through 13, wherein the first subset of the frequency resources is interleaved with the second subset of the frequency resources within the contiguous set of frequency resources.

Aspect 15: A method for wireless communication at a base station, comprising: allocating a set of resources to a UE for an uplink communication from the UE to the base station, the set of resources including a set of frequency resources and a set of time domain resources, wherein the uplink communication uses a single antenna panel at the UE; determining a first precoding indication for a first subset of the set of frequency resources, and a second precoding indication for a second subset of the set of frequency resources; and transmitting, to the UE, control information having a resource grant for the uplink communication from the UE, wherein the control information allocates the set of frequency resources for the uplink communication and includes the first precoding indication and the second precoding indication.

Aspect 16: The method of aspect 15, further comprising: configuring the UE with a first uplink reference signal resource set and a second uplink reference signal resource set, and wherein the first precoding indication is associated with the first uplink reference signal resource set and the second precoding indication is associated with the second uplink reference signal resource set.

Aspect 17: The method of aspect 16, wherein the first uplink reference signal resource set is identified by a first SRS resource indicator (SRI) that is provided in the control information and is associated with the first precoding indication, and the second uplink reference signal resource set is identified by a second SRI that is provided in the control information and is associated with the second precoding indication.

Aspect 18: The method of any of aspects 16 through 17, wherein the first uplink reference signal resource set and the second uplink reference signal resource set are each configured for codebook-based or non-codebook-based multiple input multiple output (MIMO) communications.

Aspect 19: The method of any of aspects 15 through 18, wherein the control information includes a single transmit power command for the uplink communication from the UE to the base station.

Aspect 20: The method of any of aspects 15 through 19, wherein the control information includes a single set of power control parameters for the uplink communication from the UE to the base station.

Aspect 21: The method of aspect 20, wherein the single set of power control parameters includes one or more of a path loss reference signal, a fractional power control parameter, a nominal transmit power, an index value associated with a power control procedure, or any combinations thereof.

Aspect 22: The method of any of aspects 15 through 21, wherein the control information includes a single transmission configuration indication (TCI), and both of the first precoding indication and the second precoding indication, for the uplink communication from the UE to the base station.

Aspect 23: The method of any of aspects 15 through 22, wherein the first subset of the set of frequency resources is associated with a first frequency hop for the uplink communication, and the second subset of the set of frequency resources is associated with a second frequency hop for the uplink communication.

Aspect 24: The method of aspect 23, wherein the first frequency hop and the second frequency hop are intra-slot frequency hops or inter-slot frequency hops.

Aspect 25: The method of any of aspects 23 through 24, wherein the control information includes one or more of a first frequency allocation indication associated with the first frequency hop, a second frequency allocation indication associated with the second frequency hop, a time domain offset value for the second frequency hop, or any combinations thereof.

Aspect 26: The method of any of aspects 15 through 22, wherein the set of frequency resources for the uplink communication span contiguous frequency resources in a same time domain resource.

Aspect 27: The method of aspect 26, wherein the first subset of the set of frequency resources and the second subset of the set of frequency resources occupy different contiguous portions of the set of frequency resources.

Aspect 28: The method of any of aspects 26 through 27, wherein the first subset of the set of frequency resources is interleaved with the second subset of the set of frequency resources.

Aspect 29: An apparatus for wireless communication at a UE, comprising a processor; memory coupled with the processor; and instructions stored in the memory and executable by the processor to cause the apparatus to perform a method of any of aspects 1 through 14.

Aspect 30: An apparatus for wireless communication at a UE, comprising at least one means for performing a method of any of aspects 1 through 14.

Aspect 31: A non-transitory computer-readable medium storing code for wireless communication at a UE, the code comprising instructions executable by a processor to perform a method of any of aspects 1 through 14.

Aspect 32: An apparatus for wireless communication at a base station, comprising a processor; memory coupled with the processor; and instructions stored in the memory and executable by the processor to cause the apparatus to perform a method of any of aspects 15 through 28.

Aspect 33: An apparatus for wireless communication at a base station, comprising at least one means for performing a method of any of aspects 15 through 28.

Aspect 34: A non-transitory computer-readable medium storing code for wireless communication at a base station, the code comprising instructions executable by a processor to perform a method of any of aspects 15 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
receiving control information having a resource grant for an uplink communication from the UE to a base station, the uplink communication using a single antenna panel at the UE, wherein the control information allocates frequency resources for the uplink communication, includes a first precoding indication that is associated with a first subset of the frequency resources and a second precoding indication that is associated with a second subset of the frequency resources, and includes a single transmission configuration indication (TCI) state, wherein the control information comprises the single TCI state and both of the first precoding indication and the second precoding indication based at least in part on the uplink communication using the single antenna panel at the UE;
transmitting a first portion of the uplink communication via the first subset of the frequency resources using a first precoder that is based at least in part on the first precoding indication; and
transmitting a second portion of the uplink communication via the second subset of the frequency resources using a second precoder that is based at least in part on the second precoding indication.

2. The method of claim 1, further comprising:
receiving configuration information for a first uplink reference signal resource set and a second uplink reference signal resource set, and wherein the first precoding indication is associated with the first uplink reference signal resource set and the second precoding indication is associated with the second uplink reference signal resource set.

3. The method of claim 2, wherein the first uplink reference signal resource set is identified by a first sounding reference signal (SRS) resource indicator (SRI) that is provided in the control information and is associated with the first precoding indication, and the second uplink reference signal resource set is identified by a second SRI that is provided in the control information and is associated with the second precoding indication.

4. The method of claim 2, wherein the first uplink reference signal resource set and the second uplink reference signal resource set are each configured for codebook-based or non-codebook-based multiple input multiple output (MIMO) communications.

5. The method of claim 1, wherein the control information includes a single transmit power command for the uplink communication from the UE to the base station.

6. The method of claim 1, wherein the control information includes a single set of power control parameters for the uplink communication from the UE to the base station.

7. The method of claim 6, wherein the single set of power control parameters includes one or more of a path loss reference signal, a fractional power control parameter, a nominal transmit power, an index value associated with a power control procedure, or any combinations thereof.

8. The method of claim 1, wherein the first subset of the frequency resources is associated with a first frequency hop for the uplink communication, and the second subset of the frequency resources is associated with a second frequency hop for the uplink communication.

9. The method of claim 8, wherein the first frequency hop and the second frequency hop are intra-slot frequency hops or inter-slot frequency hops.

10. The method of claim 8, wherein the control information includes one or more of a first frequency allocation indication associated with the first frequency hop, a second frequency allocation indication associated with the second frequency hop, a time domain offset value for the second frequency hop, or any combinations thereof.

11. The method of claim 1, wherein the frequency resources for the uplink communication span a contiguous set of frequency resources in a same time domain resource.

12. The method of claim 11, wherein the first subset of the frequency resources and the second subset of the frequency resources occupy different contiguous portions of the contiguous set of frequency resources.

13. The method of claim 11, wherein the first subset of the frequency resources is interleaved with the second subset of the frequency resources within the contiguous set of frequency resources.

14. A method for wireless communication at a base station, comprising:
allocating a set of resources to a user equipment (UE) for an uplink communication from the UE to the base station, the set of resources including a set of frequency resources and a set of time domain resources, wherein the uplink communication uses a single antenna panel at the UE;
determining a first precoding indication for a first subset of the set of frequency resources, and a second precoding indication for a second subset of the set of frequency resources; and
transmitting, to the UE, control information having a resource grant for the uplink communication from the UE, wherein the control information allocates the set of frequency resources for the uplink communication, includes the first precoding indication and the second precoding indication, and includes a single transmission configuration indication (TCI) state, wherein the control information comprises the single TCI state and both of the first precoding indication and the second precoding indication based at least in part on the uplink communication using the single antenna panel at the UE.

15. The method of claim 14, further comprising:
configuring the UE with a first uplink reference signal resource set and a second uplink reference signal resource set, and wherein the first precoding indication is associated with the first uplink reference signal resource set and the second precoding indication is associated with the second uplink reference signal resource set.

16. The method of claim 15, wherein the first uplink reference signal resource set is identified by a first sounding reference signal (SRS) resource indicator (SRI) that is provided in the control information and is associated with the first precoding indication, and the second uplink reference signal resource set is identified by a second SRI that is provided in the control information and is associated with the second precoding indication.

17. The method of claim 15, wherein the first uplink reference signal resource set and the second uplink reference signal resource set are each configured for codebook-based or non-codebook-based multiple input multiple output (MIMO) communications.

18. The method of claim 14, wherein the control information includes a single transmit power command for the uplink communication from the UE to the base station.

19. The method of claim 14, wherein the control information includes a single set of power control parameters for the uplink communication from the UE to the base station.

20. The method of claim 19, wherein the single set of power control parameters includes one or more of a path loss reference signal, a fractional power control parameter, a nominal transmit power, an index value associated with a power control procedure, or any combinations thereof.

21. The method of claim 14, wherein the first subset of the set of frequency resources is associated with a first frequency hop for the uplink communication, and the second subset of the set of frequency resources is associated with a second frequency hop for the uplink communication.

22. A user equipment (UE) for wireless communication, comprising:
  at least one processor;
  at least one memory coupled with the at least one processor; and
  instructions stored in the at least one memory and executable by the at least one processor to cause the UE to:
    receive control information having a resource grant for an uplink communication from the UE to a network entity, the uplink communication using a single antenna panel at the UE, wherein the control information allocates frequency resources for the uplink communication, includes a first precoding indication that is associated with a first subset of the frequency resources and a second precoding indication that is associated with a second subset of the frequency resources, and includes a single transmission configuration indication (TCI) state, wherein the control information comprises the single TCI state and both of the first precoding indication and the second precoding indication based at least in part on the uplink communication using the single antenna panel at the UE;
    transmit a first portion of the uplink communication via the first subset of the frequency resources using a first precoder that is based at least in part on the first precoding indication; and
    transmit a second portion of the uplink communication via the second subset of the frequency resources using a second precoder that is based at least in part on the second precoding indication.

23. The UE of claim 22, wherein the instructions are further executable by the at least one processor to cause the UE to:
  receive configuration information for a first uplink reference signal resource set and a second uplink reference signal resource set, and wherein the first precoding indication is associated with the first uplink reference signal resource set and the second precoding indication is associated with the second uplink reference signal resource set.

24. The UE of claim 23, wherein the first uplink reference signal resource set is identified by a first sounding reference signal (SRS) resource indicator (SRI) that is provided in the control information and is associated with the first precoding indication, and the second uplink reference signal resource set is identified by a second SRI that is provided in the control information and is associated with the second precoding indication.

25. The UE of claim 22, wherein the control information includes a single transmit power command for the uplink communication from the UE to the network entity, a single set of power control parameters for the uplink communication, or both.

26. A network entity for wireless communication, comprising:
  at least one processor;
  at least one memory coupled with the at least one processor; and
  instructions stored in the at least one memory and executable by the at least one processor to cause the network entity to:
    allocate a set of resources to a user equipment (UE) for an uplink communication from the UE to the network entity, the set of resources including a set of frequency resources and a set of time domain resources, wherein the uplink communication uses a single antenna panel at the UE;
    determine a first precoding indication for a first subset of the set of frequency resources, and a second precoding indication for a second subset of the set of frequency resources; and
    transmit, to the UE, control information having a resource grant for the uplink communication from the UE, wherein the control information allocates the set of frequency resources for the uplink communication, includes the first precoding indication and the second precoding indication, and includes a single transmission configuration indication (TCI) state, wherein the control information comprises the single TCI state and both of the first precoding indication and the second precoding indication based at least in part on the uplink communication using the single antenna panel at the UE.

27. The network entity of claim 26, wherein the instructions are further executable by the at least one processor to cause the network entity to:
  configure the UE with a first uplink reference signal resource set and a second uplink reference signal resource set, and wherein the first precoding indication is associated with the first uplink reference signal resource set and the second precoding indication is associated with the second uplink reference signal resource set.

28. The network entity of claim 26, wherein the control information includes a single transmit power command for the uplink communication from the UE to the network entity, a single set of power control parameters for the uplink communication from the UE to the network entity, or both.

29. The network entity of claim 26, wherein the first subset of the set of frequency resources is associated with a first frequency hop for the uplink communication, and the second subset of the set of frequency resources is associated with a second frequency hop for the uplink communication.

30. The network entity of claim 27, wherein the first uplink reference signal resource set is identified by a first sounding reference signal (SRS) resource indicator (SRI) that is provided in the control information and is associated with the first precoding indication, and the second uplink reference signal resource set is identified by a second SRI that is provided in the control information and is associated with the second precoding indication.

* * * * *